US008339660B2

(12) United States Patent

Kageyama et al.

(10) Patent No.: US 8,339,660 B2
(45) Date of Patent: Dec. 25, 2012

(54) TANDEM CONTINUOUS PAPER PRINTER

(75) Inventors: Seiji Kageyama, Kanagawa (JP); Muneyoshi Akai, Ibaraki (JP); Hiroshi Udo, Ibaraki (JP); Shinichi Kishi, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 732 days.

(21) Appl. No.: 11/205,033

(22) Filed: Aug. 17, 2005

(65) Prior Publication Data

US 2006/0039015 A1 Feb. 23, 2006

(30) Foreign Application Priority Data

| | | |
|---|---|---|
| Aug. 18, 2004 | (JP) | P2004-237945 |
| May 31, 2005 | (JP) | P2005-158419 |
| Aug. 5, 2005 | (JP) | P2005-228313 |

(51) Int. Cl.
*G06F 15/00* (2006.01)

(52) U.S. Cl. ...... 358/1.9; 358/1.13; 358/1.14; 358/1.15; 358/1.16; 358/518; 358/523; 347/115; 347/172

(58) Field of Classification Search .................. 358/518, 358/3.23, 530, 523–525, 1.13, 1.1, 1.14, 358/1.15, 1.9
See application file for complete search history.

(56) References Cited

U.S. PATENT DOCUMENTS

| | | | | |
|---|---|---|---|---|
| 6,198,896 | B1 * | 3/2001 | Nakayasu et al. | 399/301 |
| 6,501,929 | B1 | 12/2002 | Warbus et al. | |
| 7,099,029 | B2 * | 8/2006 | Hopper | 358/1.15 |
| 2002/0015177 | A1 * | 2/2002 | Yamakado et al. | 358/1.15 |
| 2004/0064278 | A1 * | 4/2004 | Robbins, III | 702/84 |
| 2004/0165025 | A1 * | 8/2004 | Ishibashi et al. | 347/19 |
| 2005/0104950 | A1 * | 5/2005 | Eom | 347/116 |

FOREIGN PATENT DOCUMENTS

| | | |
|---|---|---|
| JP | 7-237336 | 9/1995 |
| JP | 2003-255635 | 9/2003 |

OTHER PUBLICATIONS

European Search Report dated Apr. 13, 2012, with partial English-language translation.

* cited by examiner

*Primary Examiner* — Twyler Haskins
*Assistant Examiner* — Brendan McCommas
(74) *Attorney, Agent, or Firm* — McGinn IP Law Group, PLLC

(57) ABSTRACT

A tandem continuous paper printer includes: a first printer engine; a second printer engine; and a printer controller; and performing tandem printing by performing printing using the second printer engine on a paper that has been printed on by the first printer engine, the tandem continuous paper printer being arranged so that the first printer engine is made to print tandem check marks on the paper at check page intervals and the second printer engine is provided with a sensor detecting the tandem check marks.

32 Claims, 14 Drawing Sheets

TANDEM CONTINUOUS PAPER PRINTER

BACKGROUND OF THE INVENTION

1. Field of the Invention

The invention relates to a tandem continuous paper printer, wherein continuous paper printers are connected in tandem to perform duplex printing.

2. Description of the Related Art

Among continuous paper printers of a tandem arrangement, there is known a tandem continuous paper printer, wherein two continuous paper printers (a first printer engine and a second printer engine) are connected in tandem to realize duplex printing.

As a related art of a tandem continuous paper printer, there is known a tandem continuous paper printer, wherein, in order to make a second printer engine perform synchronized printing on a page printed on by a first printer engine, a mark is printed on the first page by the first printer engine and the second printer engine starts printing upon detecting this mark (see, for example, JP-A-7-237336). With this printing system, the printing start positions of the two engines can be synchronized in regard to the first page of a print job. For subsequent pages, the maintenance of the page relationship among the two printer engines is aimed at by the continuation of normal printing by the two printer engines.

A mark is printed by a continuous paper printer (see, for example, JP-A-2003-255635). The mark printed by this continuous paper printer is for "indicating a page partition for the starting of printing by a continuous paper printer that uses paper without perforations." By this mark, the page head can be matched for the first page on which printing is started when using the paper without perforations. However, this arrangement is not used for checking whether or not the front and back of each page are matched, is furthermore described in regard to a continuous paper printer engine, and there are no descriptions concerning relationships with a printer controller.

SUMMARY OF THE INVENTION

With the tandem arrangement printer described in JP-A-7-237336, the synchronization may deviate during execution of printing using the two printer engines, that is, a deviation in regard to the paper length may arise between the two printer engines and consequently, the page relationship among the two printer engines may deviate.

(1) Specifically, the following two cases can be cited.

The printing by one of the printers is stopped due to some cause.

The following can be cited as the cause of this.

(a) An operator instructs interruption of the printing process from an operation panel, etc.

(b) The printing process is stopped due to the occurrence of a "no paper" event or other event.

(c) The printing process is stopped due to the occurrence of a paper jam or other emergency stop error at one of the engines.

Here, in the case of (b), a printer engine stops at a page partition (perforations, etc.). In the case of (c), since a printer engine stops immediately at the point at which the error occurs, it may not necessarily stop at a page partition (perforations, etc.).

(2) The drawing speed for a page cannot keep up with the engine printing speed

Consider a case where a page of a print job comprises complex print data and the drawing time taken up by a drawing unit is long compared to the printing time of a printer engine. In this case, the drawing speed for a page cannot keep up with the engine printing speed and the printing of the page undergoes emergency stop. Upon emergency stop, the page relationship among the two printer engines deviates. In accompaniment with the emergency stop, intermittent printing occurs.

In cases such as the above, printing results, the relationship between a page printed by the first printer engine and the page printed by the second printer engine is deviated, may be obtained by the tandem continuous paper printer described in JP-A-7-237336. In this case, a user has to check all pages visually for whether or not the printed matter has been output with the page relationship being deviant.

As described above, with systems that perform duplex printing by a tandem arrangement of a first printer engine and a second printer engine, when one of the printers undergoes emergency stop, etc. due to some cause, the page relationship of the two printer engines becomes a page relationship that is not normal.

According to one aspect of the invention, there is provided a tandem continuous paper printer including: a first printer engine; a second printer engine; and a printer controller. Tandem printing is performed by using the second printer engine on paper that has been printed on by the first printer engine. The first printer engine, apart from performing printing of print data that make up a print job, performs printing of a tandem check mark on the paper at each page interval called "a check page interval S". The second printer engine has a sensor detecting the tandem check mark. Whether or not the tandem check mark printed by the first printer engine is recognized at the check page interval S is checked by using the sensor, when printing of the respective pages by the second printer engine is performed. The second printer engine continues with the printing of the print data, if the tandem check mark is recognized by the sensor. The printing of the print data is stopped, if the tandem check mark is not recognized by the sensor.

According to another aspect of the invention, if the tandem check mark is not recognized, the printer controller executes error recovery printing after the printing is stopped.

According to another aspect of the invention, the tandem continuous paper printer performs a tandem duplex print mode, in which, after the first printer engine performs printing on a front surface of a paper, the paper is inverted and then supplied to the second printer engine, and the second printer engine performs printing on a back surface of the inverted paper. A sensor, installed at the second printer engine to detect marks on the back surface side of the inverted paper, is used to recognize the tandem check marks.

According to another aspect of the invention, the tandem continuous paper printer performs a tandem single-side print mode, in which, after the first printer engine performs printing on a front surface of a paper, the paper is supplied as it is without being inverted to the second printer engine and the second printer engine performs printing on the front surface of the paper. A sensor, installed at the second printer engine to detect marks on the front surface side of the paper, is used to recognize the tandem check marks.

According to another aspect of the invention, the first printer engine and the second printer engine are electrophotographic printer engines equipped at least with an imaging drum and a fixing unit. The check page interval S is of a length corresponding to a recovery length for a paper interval, for which fixing by the fixing unit is not guaranteed when an emergency stop error occurs at a printer engine.

According to another aspect of the invention, the check page interval S is an integral multiple of the paper length.

According to another aspect of the invention, (a) the paper or (b) each page in a print job is managed by a page serial number of a single page unit. The page serial number is counted beyond each individual print job and across a plurality of print jobs. Management of a check page interval S is performed using the page serial number.

According to another aspect of the invention, the check page interval S is set to a length corresponding to half a recovery length for a paper interval, for which fixing by the fixing unit is not guaranteed when an emergency stop error occurs at a printer engine. When the tandem check marks are undetected consecutively for two check page intervals S, the printing is stopped.

According to another aspect of the invention, each pattern in a plurality of pattern series is repeated in order and used as the tandem check pattern.

According to another aspect of the invention, if the tandem check mark is not recognized, the printer controller executes error recovery printing after the printing is stopped.

According to another aspect of the invention, the tandem continuous paper printer has a tandem duplex print mode, in which, after the first printer engine performs printing on a front surface of a paper, the paper is inverted and then supplied to the second printer engine, and the second printer engine performs printing on a back surface of the inverted paper. A sensor, installed at the second printer engine to detect marks on the back surface side of the inverted paper, is used to recognize the tandem check marks.

According to another aspect of the invention, the tandem continuous paper printer has a tandem single-side print mode, in which, after the first printer engine performs printing on a front surface of a paper, the paper is supplied as it is without being inverted to the second printer engine and the second printer engine performs printing on the front surface of the paper. A sensor, installed at the second printer engine to detect marks on the front surface side of the paper, is used to recognize the tandem check marks.

According to another aspect of the invention, the first printer engine and the second printer engine are electrophotographic printer engines equipped at least with an imaging drum and a fixing unit. The check page interval S is of a length corresponding to a recovery length for a paper interval, for which fixing by the fixing unit is not guaranteed when an emergency stop error occurs at a printer engine.

According to another aspect of the invention, the check page interval S is an integral multiple of the paper length.

According to another aspect of the invention, the paper has a page serial number of a single page unit. The page serial number is counted beyond each individual print job and across a plurality of print jobs. Management of a fixed page interval is performed using the page serial number.

According to another aspect of the invention, the check page interval S is set to a length corresponding to half a recovery length for a paper interval, for which fixing by the fixing unit is not guaranteed when an emergency stop error occurs at a printer engine. When the tandem check marks are undetected consecutively for two check page intervals S, the printing is stopped.

According to another aspect of the invention, each of the plurality of pattern series includes a plurality of element marks.

According to another aspect of the invention, each of the plurality of pattern series comprises a plurality of element marks. In the printing of each page by the second printer engine, the number of element marks is counted each time a tandem check pattern is recognized. Whether or not the printed tandem check mark is recognized correctly is judged based on the counted number of element marks.

According to another aspect of the invention, each of the plurality of pattern series comprises a plurality of element marks. Each element mark expresses a binary value so that each pattern expresses a numerical value. In the printing of each page by the second printer engine, the element marks are recognized numerically as a binary number of plural digits. Whether or not the printed tandem check pattern is recognized correctly is judged based on the recognized numerical value.

According to another aspect of the invention, the check page interval S is a random interval.

According to another aspect of the invention, a tandem continuous paper printer including: a first printer engine; a second printer engine; and a printer controller. Tandem printing is performed by using the second printer engine on a paper that has been printed on by the first printer engine. The first printer engine, apart from performing printing of print data that make up a print job, performs printing of a tandem check mark on the paper at each check page interval S. The second printer engine has a sensor detecting the tandem check mark. In performing the printing of each page, the second printer engine checks, by the sensor, whether or not the tandem check mark printed by the first printer engine exists at each check page interval S. If the tandem check mark is detected, the second printer engine continues with the printing of the print data while if the tandem check mark is not detected, the printing is stopped.

According to another aspect of the invention, if the tandem check mark is not detected, the printer controller executes error recovery printing after the printing is stopped.

According to another aspect of the invention, the tandem continuous paper printer has a tandem duplex print mode, in which, after the first printer engine performs printing on a front surface of a paper, the paper is inverted and then supplied to the second printer engine, and the second printer engine performs printing on a back surface of the inverted paper. A sensor, installed at the second printer engine to detect marks on the back surface side of the inverted paper, is used to detect the tandem check marks.

According to another aspect of the invention, the tandem continuous paper printer performs having a tandem single-side print mode, in which, after the first printer engine performs printing on a front surface of a paper, the paper is supplied as it is without being inverted to the second printer engine and the second printer engine performs printing on the front surface of the paper. A sensor, installed at the second printer engine to detect marks on the front surface side of the paper, is used to detect the tandem check marks.

According to another aspect of the invention, the first printer engine and the second printer engine are electrophotographic printer engines equipped at least with an imaging drum and a fixing unit. The check page interval S is of a length corresponding to a recovery length for a paper interval, for which fixing by the fixing unit is not guaranteed when an emergency stop error occurs at a printer engine.

According to another aspect of the invention, the check page interval S is an integral multiple of the paper length.

According to another aspect of the invention, the paper has a page serial number of a single page unit. The page serial number is counted beyond each individual print job and across a plurality of print jobs. Management of a check page interval S is performed using the page serial number.

According to another aspect of the invention, the check page interval S is set to a length corresponding to half a recovery length for a paper interval, for which fixing by the fixing unit is not guaranteed when an emergency stop error occurs at a printer engine. When the tandem check marks are undetected consecutively for two check page intervals S, the printing is stopped.

According to the above-aspects of the invention, by the first printer engine printing tandem check marks at check page intervals and the second printer engine checking whether or not the tandem check marks are recognized, whether or not there is mismatching of the page relationship of the printing by the first printer engine and the printing by the second printer engine can be verified.

If there is a mismatching of the relationship, this is notified to an operator or user by an error process, and after resetting and matching the page relationship among the two engines, the print job from the portion of mismatched relationship onwards can be printed again under the page relationship that has been reset correctly.

The reliability of the tandem printing system can thus be increased.

DESCRIPTION OF THE PREFERRED EMBODIMENTS

Embodiments will be described with reference to the drawings.

First Embodiment

Figure 1:
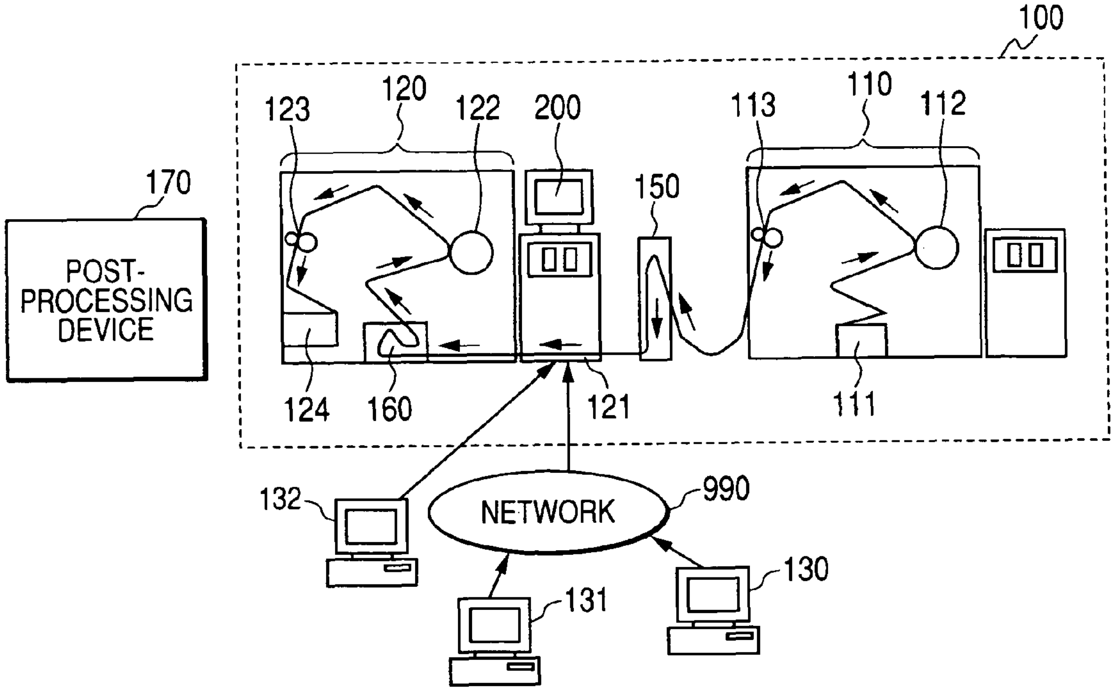
FIG. 1 shows a diagram for describing the overall arrangement of a tandem continuous paper printer according to a first embodiment of the invention.

FIG. 1 shows overall arrangement of the tandem continuous paper printer. A tandem continuous paper printer 100 mainly comprises a first printer engine 110, a second printer engine 120, and a printer controller 200. The first printer engine 110 has a paper supply unit 111, an imaging drum 112, a fixing unit 113, etc. A folded type continuous paper (referred to hereinafter as "paper") is set in the paper supply unit 111. The imaging drum 112 is used to execute imaging, transfer, and other electrophotography processes on the paper supplied from the paper supply unit 111. Though not illustrated, at the surroundings of the imaging drum 112 are provided a charging member, which charges the imaging drum, an exposure member, which exposes the imaging drum surface, a developing member, which deposits toner and develops an image, a transfer member, which transfers the toner image onto the paper, a cleaning member, which cleans off the residual toner that remains without being transferred, etc. Thereafter, the toner image that has been transferred onto the paper is fixed onto the paper by use of the fixing unit 113. Besides folded type paper, a roll type paper can be supplied to the first printer engine 110 upon connection of a roll paper supply device (not shown).

The second printer engine 120 has an imaging drum 122, a fixing unit 123, etc. Though the second printer engine 120 also has a paper supply unit as does the first printer engine, since this paper supply unit is not used in a tandem arrangement, it is omitted from the present FIGURE. In a below-described print mode other than the tandem mode, the paper supply unit is used at the second printer engine 120 as well. The functions of the respective units of the imaging drum 122 and fixing unit 123 are the same as those of the first printer engine 110.

The printer controller 200 receives print data from upper-level computers 130, 131, 132, etc., and after carrying out a drawing process, outputs image data to the first printer engine 110 and the second printer engine 120.

The printer controller 200 is provided with a print mode setting unit 4610 that enables the setting of the print mode, such as the tandem duplex print mode. This print mode setting unit 4610 shall be described later using FIG. 4. In order to realize tandem printing using the first printer engine 110 and the second printer engine 120, a paper inverting unit 150, a paper inserting unit 121, and a paper winding unit 160 are added.

The computers 130 and 131 are connected to the printer controller 200 via a network 990. The computer 132 is connected to the printer controller 200 via a local interface. Physically, the local interface is realized as a printer local I/F cable of FIG. 9 to be described later.

In the tandem duplex print mode, the paper inverting unit 150 inverts a paper, on a first surface of which printing has been performed by the first printer engine 110, and outputs the paper to the second printer engine 120. In the tandem single-side print mode, the paper is passed as it is through the paper inverting unit 150 without being inverted. The second printer engine 120 receives the paper that has been conveyed through the paper inverting unit 150 from the paper inserting unit 121 and sends the paper to the paper winding unit 160. The paper winding unit 160 winds up the paper supplied to the second printer engine 120 and supplies the paper to the electrophotography processes of the imaging drum 122, etc., of the second printer engine 120.

Thus by the use of the paper inverting unit 150, the paper inserting unit 121, and the paper winding unit 160, printing by the first printer engine 110 is carried out first and then printing by the second printer engine 120 is carried out to realize tandem printing.

The paper that has been printed on by the second printer engine 120 is output to a stacker unit 124 or a post-processing device 170 in accordance with the paper loading performed by an operator. The output to the post-processing device 170 is especially effective when a large-volume roll paper supply device is used as the paper of the first printer engine 110.

The four print modes of the tandem duplex print mode, tandem single-side print mode, independent two-engine single-side print mode, and single-engine single-side print mode are prepared in the tandem continuous paper printer. The operator can set one of these modes using the print mode setting unit 4610. Of the four modes, the tandem duplex print mode and the tandem single-side print mode are modes in which printing is carried out by a tandem arrangement. Tandem single-side print mode can be called tandem simplex mode as an another term.

In the tandem duplex print mode, after printing on the front surface is performed by the first printer engine 110, the paper is inverted by the paper inverting unit 150 and then supplied to the second printer engine 120. The second printer engine 120 performs printing on the back surface of the inverted paper. In the tandem single-side print mode, after printing on the front surface is performed by the first printer engine 110, the paper inverting unit 150 supplies the paper as it is without inversion to the second printer engine 120. Thus as with the first printer engine 110, the second printer engine 120 also performs printing on the front surface of the paper. This mode is useful for spot color printing. The operations in the case of the independent two-engine single-side print mode and the single-engine single-side print mode shall be described later using FIG. 4.

The circumstances of printing onto paper by the tandem continuous paper printer shall now be described using FIG. 2. Though the description shall mainly concern the tandem duplex print mode, the tandem single-side print mode can also be realized in a similar manner.

First, after printing on the front surface of the paper using the imaging drum 112, etc., is performed at the first printer engine 110, the paper is inverted by the paper inverting unit 150 and supplied to the second printer engine 120. The second printer engine 120 performs printing on the back surface of the inverted paper using the imaging drum 122, etc. Between the printing by the first printer engine 110 and the printing by the second printer engine 120, the page that is printed is shifted by an inter-engine paper difference value δ 220.

The first printer engine 110 and the second printer engine 120 perform printing at a physical paper size unit to be described later using FIGS. 3 and 4. The inter-engine paper difference value δ 220 is thus counted using the number of pages of the physical paper size as the unit.

That is, the page Nf, which the first printer engine 110 is printing, and the page Nb, which the second printer engine 120 is printing, are in the relationship shown below. Here, the unit of each of Nf, Nb, and δ is the page serial No. of pages of the physical paper size. This page serial No. shall also be described later.

$$Nf=Nb+\delta+1 \qquad \text{(Equation 1)}$$

Figure 2:
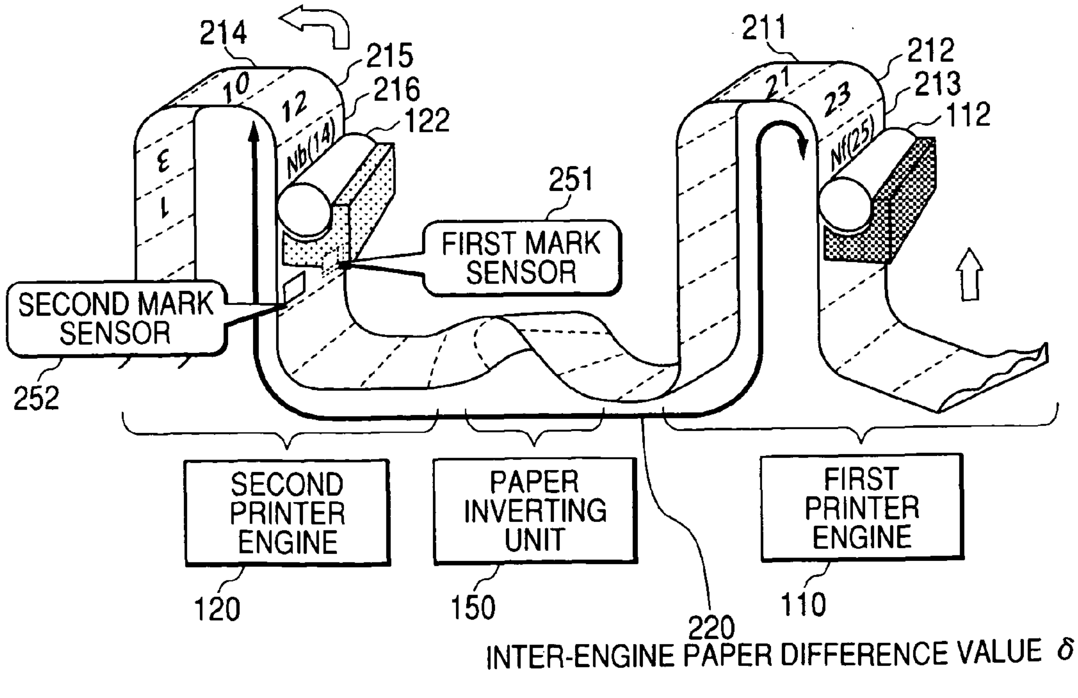
FIG. 2 shows a diagram for describing the circumstances of printing onto paper by the tandem continuous paper printer.

FIG. 2 illustrates the case where δ=10, and when Nb=14, Nf is 25.

As shown in FIG. 2, the second printer engine 120 is provided with two mark sensors, that is, a first mark sensor 251 and a second mark sensor 252. The first mark sensor 251 and the second mark sensor 252 are sensors for detecting tandem check marks printed by the first printer engine in the tandem duplex print mode and the tandem single-side print mode, respectively. By these detections, whether or not the tandem check marks are recognized at an appropriate timing and to be of the predetermined form is judged.

The first mark sensor 251 may be used when the second printer engine 120 performs printing on the surface opposite the paper surface on which the first printer engine 110 has printed in the tandem duplex print mode.

The second mark sensor 252 may be used when the second printer engine 120 performs printing on the same surface as the paper surface on which the first printer engine 110 has printed in the tandem single-side print mode.

Figure 3:
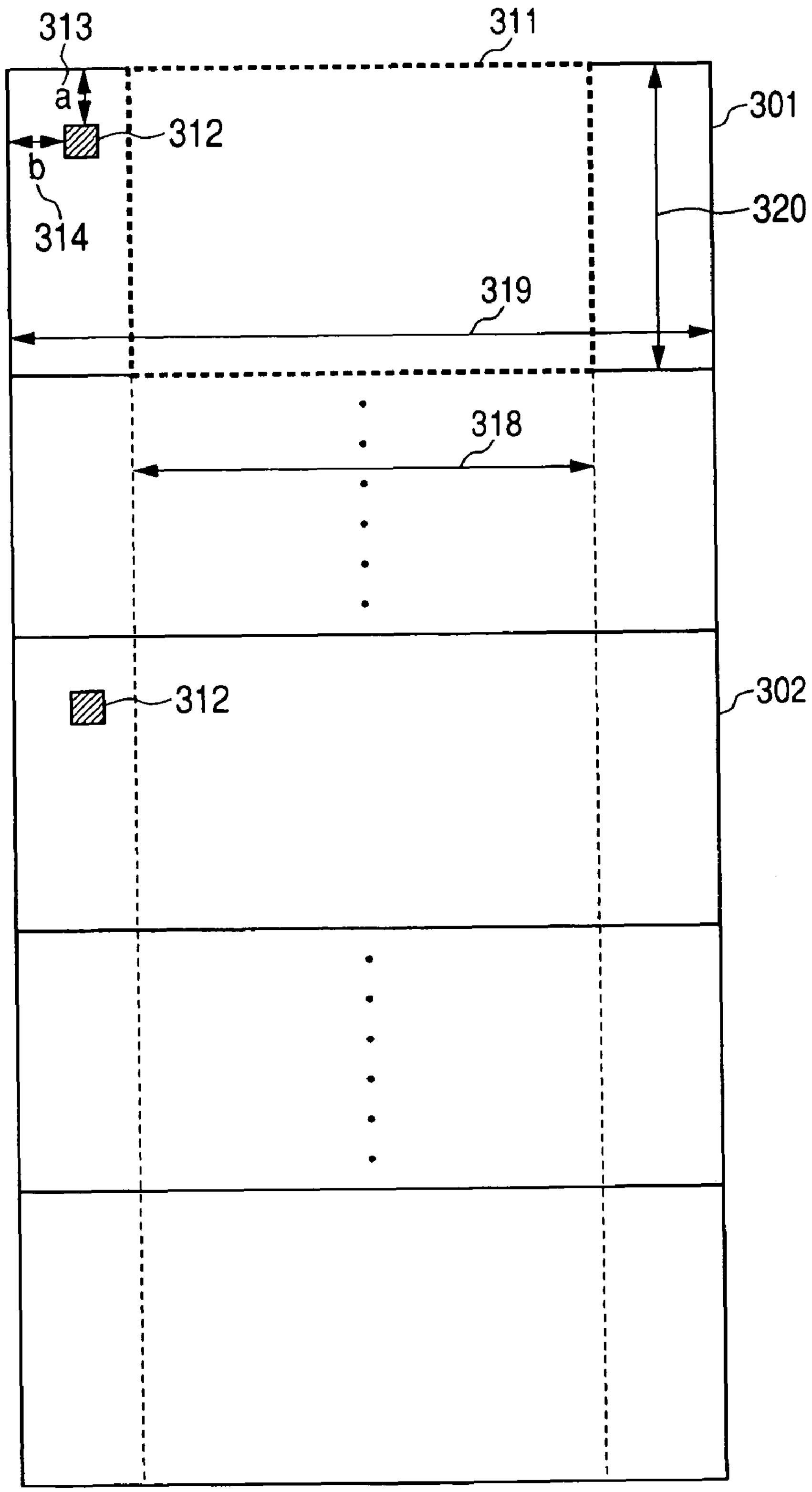
FIG. 3 shows a diagram for describing tandem check marks, etc.

The tandem check marks 312 for checking the relationship of the first printer engine 110 and the second printer engine 120 in tandem printing may be described by FIG. 3. Here, FIG. 3 shows a paper schematically. The tandem check marks 312 are printed by the first printer engine 110. Each tandem check mark 312 is printed at a position of length a in the paper feeding direction (vertical direction of FIG. 3) from a page partition of the continuous paper and of length b from the left end of the paper. In the first embodiment, a single pattern is used as a tandem check pattern. Examples of using a plurality of patterns are described as the second embodiment onwards. The values of "a" and "b" are determined by the physical position, etc., of the first mark sensor 251 and the second mark sensor 252. For example, these are set as a=1.5 inches and b=0.4875 inches. In order to use these marks in combination with marks to be used for other purposes, arrangements are made so that favorable numerical values within the range of the paper can be set suitably for a and b by the operator from a user interface control unit 4600 and so that the tandem check marks will not overlap with other marks. It is especially important to enable a to be set freely.

The arrangement and processing contents of the printer controller 200 shall now be described using FIG. 4. As shown in FIG. 4, the printer controller 200 is provided with an upper-level interface unit 4100, a drawing unit 4300, a printing control unit 4500, the user interface control unit 4600, a first engine control unit 4551, a second engine control unit 4552, and an error processing unit 4700 as the respective processing units. For storage of various types of data, the printer controller 200 is provided with a page buffer memory unit 4400 and a print mode 4710.

The upper-level interface unit 4100 shall be described first. The upper-level interface unit 4100 receives print data from the upper-level computers using various interfaces, such as the network, local interface.

Here, the print data take the form of a print command sequence, page description language, or other form that can be processed by the drawing unit 4300. Examples of print command sequence and page description language include PostScript (registered trademark), PDF (Portable Document Format; registered trademark), and TIFF (Tagged Image File Format; registered trademark) of Adobe Systems Inc., PCL-5, PCL-5E, PCL-6, and PCL-XL (registered trademarks) of Hewlett-Packard Co., JPEG, etc. With the first embodiment, any one or more of these PDL's can be supported.

With the first embodiment, Ethernet (registered trademark), Token-Ring, FDDI (Fiber Distributed Data Interface), ATM (Asynchronous Transfer Mode), ISDN (Integrated Services Digital Network), ADSL, wireless LAN (IEEE802.11a, IEEE802.11b, IEEE802.1g, etc.), Bluetooth, etc., are used as the physical I/F of the network 990.

Also as the local interface, Centronix, SCSI, fiber channel, IEEE1394, USB, RS-232C, RS-422/423, etc., are used.

The drawing unit 4300 inputs the print data from the upper-level interface unit 4100, performs drawing, that is, the dot expansion of each character element, graphics element, and image element that makes up the print data into a dot image format, writes and outputs the dot image data into the page buffer memory unit 4400. The page buffer memory unit 4400 is arranged to store the dot image data for a plurality of pages.

The paper size managed by the page buffer memory unit 4400 is set to the size of the paper handled by the first printer engine 110 and the second printer engine 120. Since this paper size is the size of the actual physical paper, it shall also be referred to as the "physical paper size." This paper shall also be referred to as the "physical paper." Though the drawing unit 4300 processes the input print data and outputs the data in the dot image format, the paper size handled by the drawing unit 4300 is made independent of the physical paper size. That is, this paper size does not necessarily have to match the physical paper size. This paper size, which is prepared by the drawing unit 4300 in accordance with the print data, shall be referred to as the logical paper size. A document of the logical paper size is embedded and printed in the physical paper size. If necessary, the post-processing device 170 is provided at a stage subsequent the second printer engine 120, and here the logical paper size is cut out from the physical paper size to complete the printed matter. In this case, the N-up function, to be described next, is effective.

With the N-up function, N logical paper pages are positioned within a physical paper page when the drawing unit 4300 performs drawing of the logical paper size within the physical paper size. Though the cases where the N of N-up is set to 2, 3, or 4, etc. are realized here, cases where N takes on other values can be realized in a similar manner.

In the case where N is 2 or 3, two or three logical paper pages are positioned in the transverse direction inside a physical paper page. The logical paper printing performance is thereby improved by two times and three times the performance of the mechanisms of the printer engines (the first printer engine and the second printer engine). This N-up function can be realized by making the physical paper size and the logical paper size independent of each other.

In FIG. 3, the physical paper size is defined by the combination of the paper width 319 and the paper length 320. The operator inputs this combination from the user interface control unit 4600 and registers it as the physical paper size. Of the physical paper size, the region in which a printer engine can actually print is just within the broken-line area, and this region shall be referred to as the "printable region 311." The paper width within which printing can be actually be performed is thus 318 (printable paper width) of FIG. 3.

The printing control unit 4500 instructs the first engine control unit 4551 or the second engine control unit 4552 to read the dot image data of each page in the page buffer memory unit 4400 and output the data to the corresponding first printer engine 110 or the second printer engine 120. In accordance with this instruction, the first engine control unit 4551 reads the dot image format data of the corresponding page in the page buffer memory unit 4400 and outputs the data to the first printer engine 110. Consequently, the printing by the first printer engine 110 is performed.

The second engine control unit 4552 reads the dot image format data of the corresponding page in the page buffer memory unit 4400 and outputs the data to the second printer engine 120. Consequently, the printing by the second printer engine 120 is performed.

The user interface control unit 4600 performs the receiving of inputs made by the operator from an input unit 920, display of the states concerning the printer controller 200, etc.

The print mode setting unit 4610 is provided in the user interface control unit 4600. By this print mode setting unit 4610, the operator can select any among the tandem duplex print mode, the tandem single-side print mode, the independent two-engine single-side print mode, and the single-engine single-side print mode as the print mode 4710 of the tandem continuous paper printer 100.

In the cases of the tandem duplex print mode and the tandem single-side print mode, the tandem continuous paper printer 100 performs printing as was described using FIG. 2. In the independent two-engine single-side print mode, each of the first printer engine 110 and the second printer engine 120 performs single-side printing of separate print jobs independently of the other. In the single-engine single-side print mode, just the second printer engine 120 is used to perform single-side printing.

The error processing unit 4700 executes individual error processes on respective errors detected by the printer controller 200.

Figure 4:
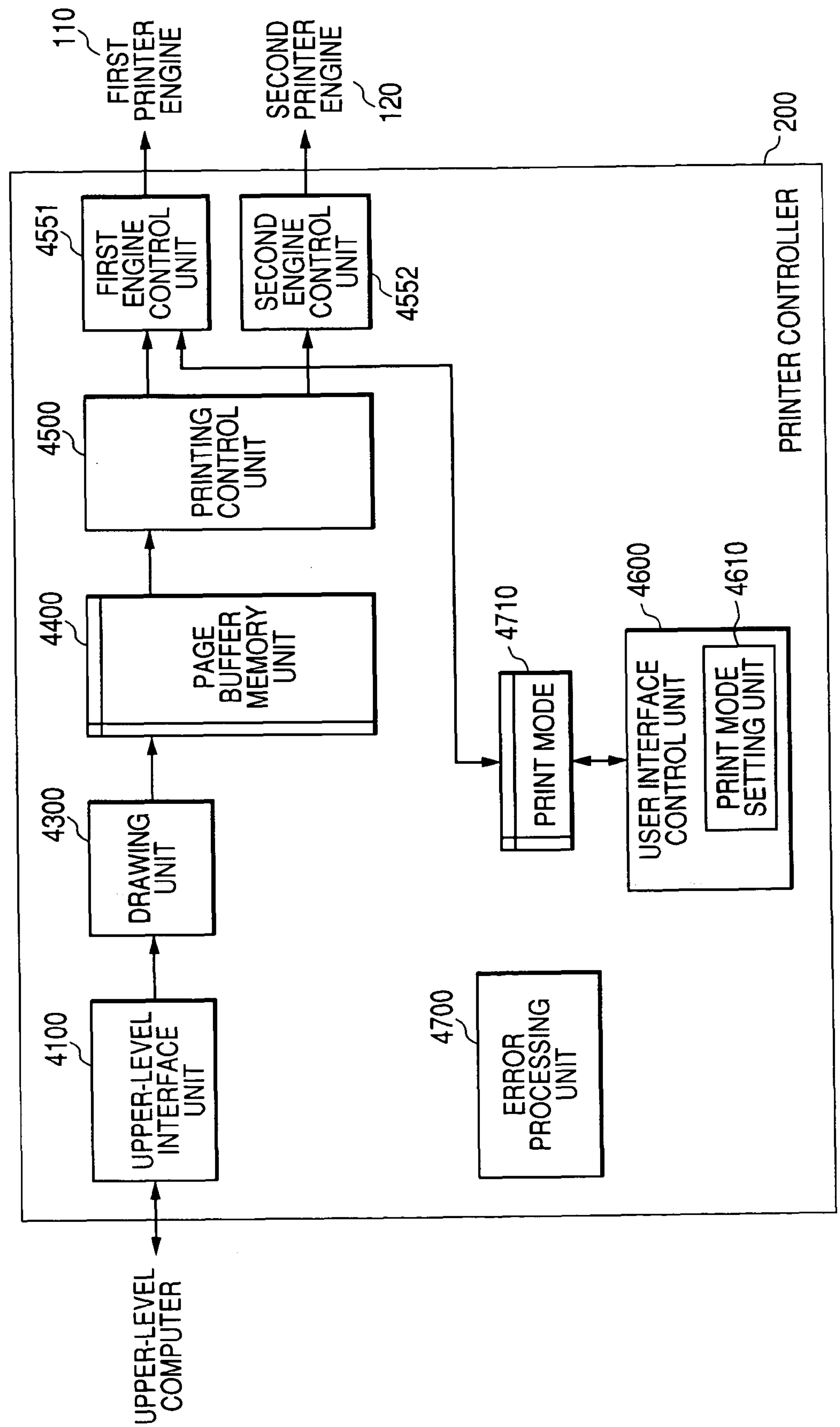
FIG. 4 shows a diagram for describing the arrangement of a printer controller.

In FIG. 4, the page buffer memory unit 4400 and the print mode 4710 are storage units. In order to clearly indicate that these are storage units, these are expressed using double lines as in FIG. 4. The print mode 4710 is a portion for storing the print mode. The print mode that is set is stored in the print mode 4710 and processes are carried out in the printer controller 200 upon referencing the value in the print mode 4710.

According to the first embodiment, a procedure for the checking of the page relationship among the two printer engines in the case where printing is performed with the two engines being connected in tandem shall now be described using FIGS. 5 to 8.

Figure 5:
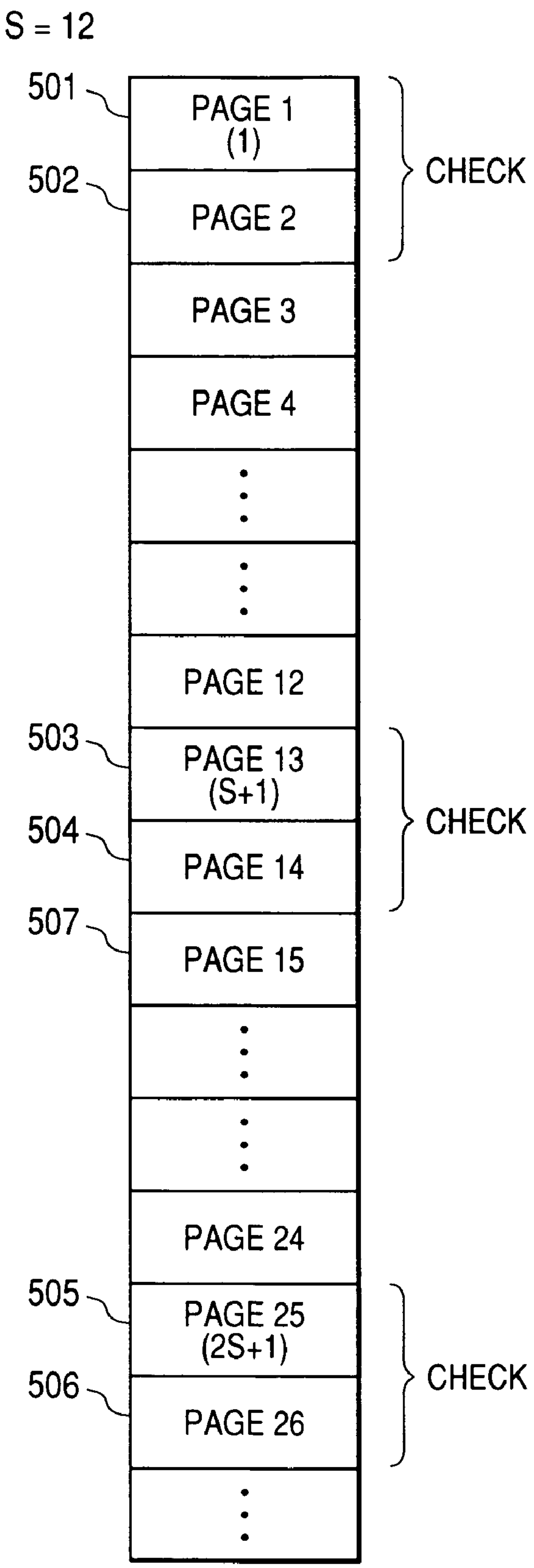
FIG. 5 shows a diagram showing an example of the results of printing onto paper.

The checking procedure shall first be described in outline by way of FIG. 5. The circumstances of printing onto paper by the tandem continuous paper printer have been described above using FIG. 2. FIG. 5 illustrates the results of printing onto paper in this case. As described with FIG. 2, $Nf=Nb+\delta+1$. FIGS. 2 and 5 illustrate a case where $\delta$ is 10 and a check page interval S=12. As shown in FIG. 5, first, the relationship is checked in regard to page 1 (501) and page 2 (502).

The relationship is then checked in regard to page S+1 (page 13 (503) in the present example) and page S+2 (page 14 (504) in the present example). The relationship is then checked in regard to page 2S+1 (page 25 (505) in the present example) and page 2S+2 (page 26 (506) in the present example).

The processing procedure of the drawing unit 4300 shall now be described using FIG. 6. For each page of a print job, the drawing unit 4300 executes a PDL drawing 602. In the PDL drawing 602, each character element, graphics element, and image element that makes up the print data is dot expanded into a dot image format and written into the page buffer memory unit 4400. In addition to this process, the drawing unit 4300 prints the tandem check mark at each check page interval S.

Figure 6:
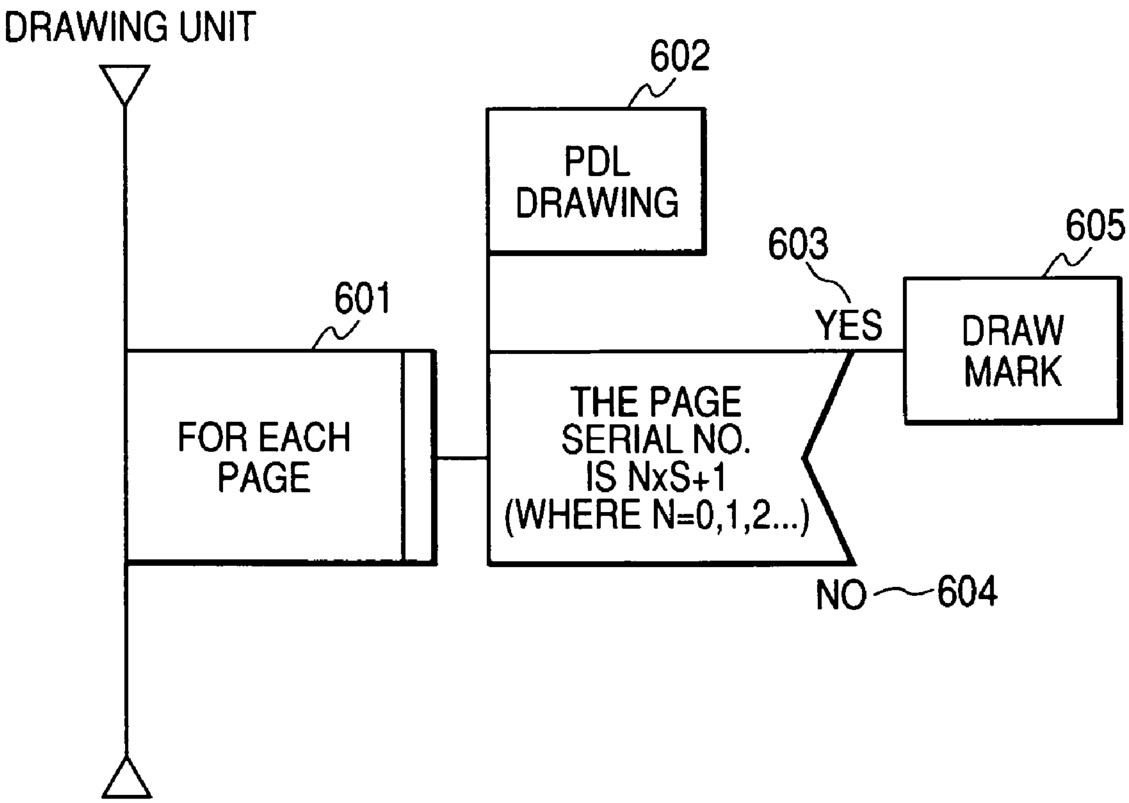
FIG. 6 shows a diagram for describing the processing procedure of a drawing unit.

Specifically in FIG. 6, on each page for which the page serial No. is N×S+1 (here, N=0, 1, 2, . . . ) (603), the tandem check mark is printed (605). If the page serial No. is not N×S+1, the tandem check mark is not printed (604). Here, the page serial No. is a serial No. for a plurality of print jobs and is counted continuously from the turning on of the power of the tandem continuous paper printer 100 to the turning off of the power. The page serial No. is initialized to 1 when the power is turned on and is thereafter incremented with each page. When a certain fixed value, for example, page 65535 is exceeded, the page serial No. is returned to 1. Here, a page is counted for each physical paper page that was described using FIGS. 3 and 4.

Figure 11:
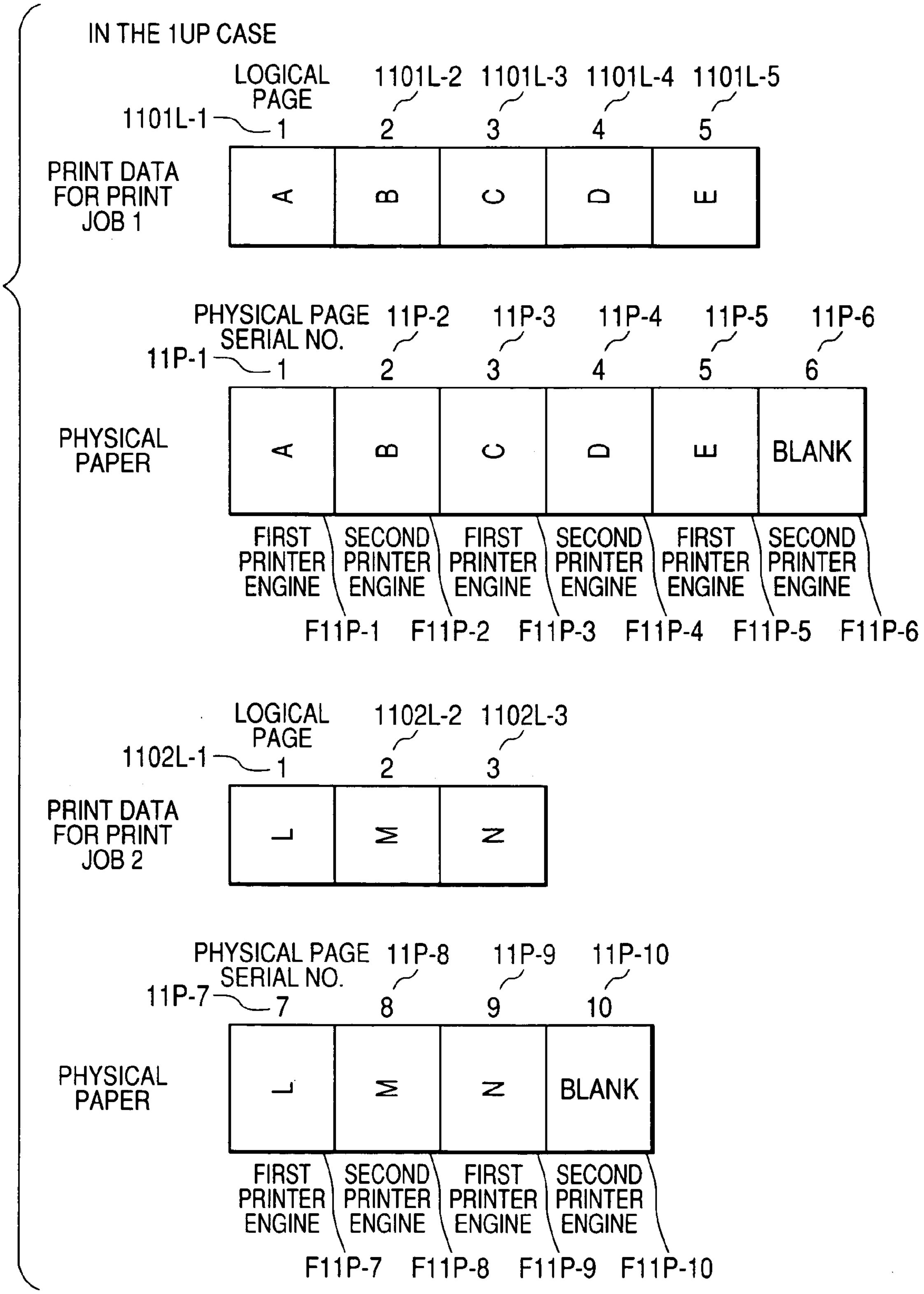
FIG. 11 shows a diagram for describing (a) the positioning of print data onto physical paper and (b) a physical page serial No. in a tandem duplex print mode and a tandem single-side print mode.
Figure 12:
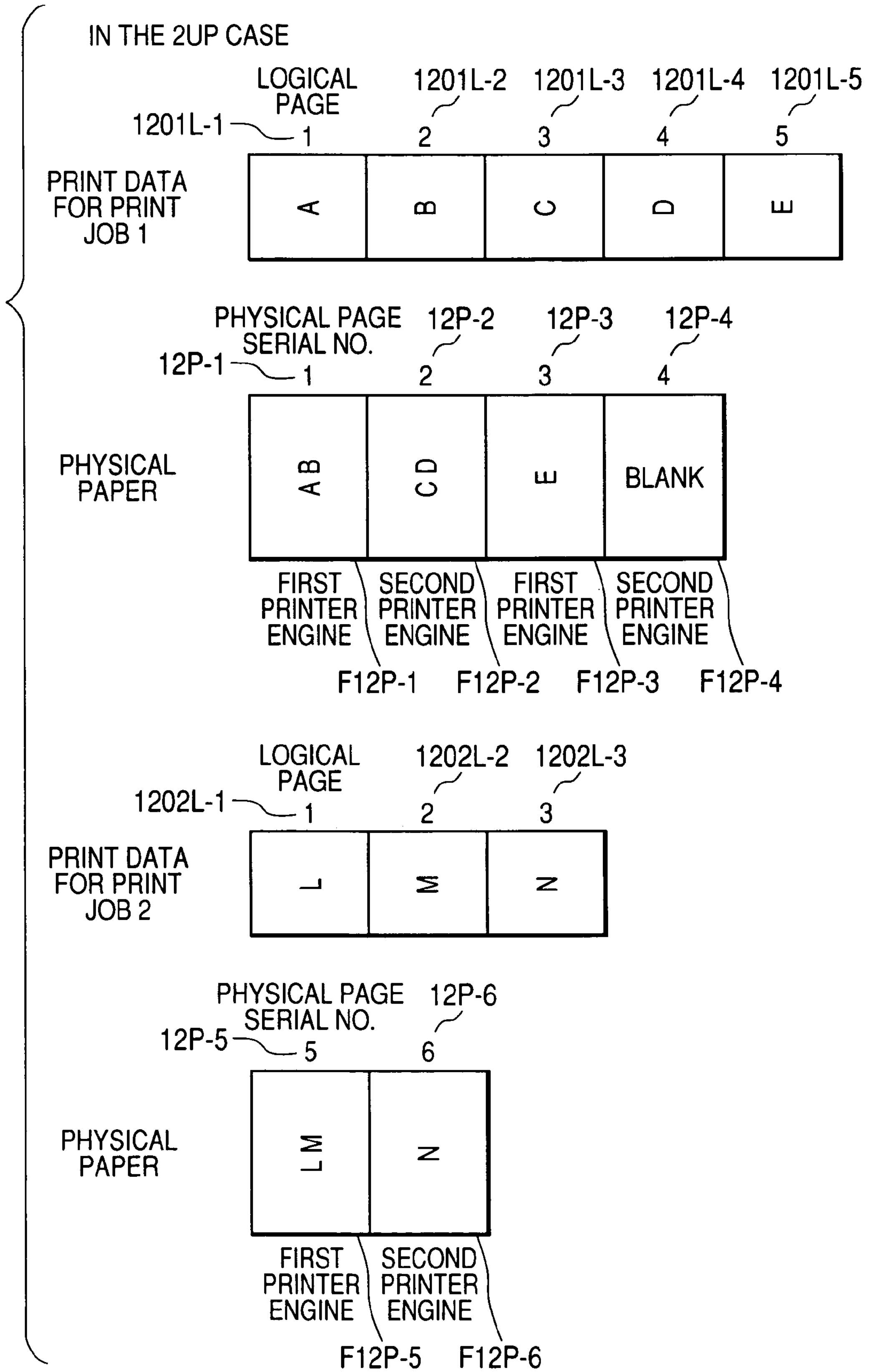
FIG. 12 shows a diagram for describing (a) the positioning of print data onto physical paper and (b) a physical page serial No. in a tandem duplex print mode and a tandem single-side print mode.

FIGS. 11 and 12 show (a) the positioning of the print data onto physical paper and (b) the physical page serial No. in the tandem duplex print mode and the tandem single-side print mode.

FIG. 11 illustrates a 1UP case. As shown in this FIGURE, of the print data of a print job 1, A is for logical page 1 (1101L-1), B is for logical page 2 (1101L-2), C is for logical page 3 (1101L-3), D is for logical page 4 (1101L-4), and E is for logical page 5 (1101L-5).

In this case, on the physical paper, the print contents (F11P-1) of physical page serial No. 1 (11P-1), the print contents (F11P-2) of physical page serial No. 2 (11P-2), the print contents (F11P-3) of physical page serial No. 3 (11P-3), the print contents (F11P-4) of physical page serial No. 4 (11P-4), the print contents (F11P-5) of physical page serial No. 5 (11P-5), and the print contents (F11P-6) of physical page serial No. 6 (11P-6) are printed.

For a print job 2, the following applies. Of the print data of the print job 2, L is for logical page 1 (1102L-1), M is for logical page 2 (1102L-2), and N is for logical page 3 (1102L-3). In this case, on the physical paper, the print contents (F11P-7) of physical page serial No. 7 (11P-7), the print contents (F11P-8) of physical page serial No. 8 (11P-8), the print contents (F11P-9) of physical page serial No. 9 (11P-9), and the print contents (F11P-10) of physical page serial No. 10 (11P-10) are printed.

FIG. 12 illustrates a 2UP case. As shown in this FIGURE, of the print data of a print job 1, A is for logical page 1 (1201L-1), B is for logical page 2 (1201L-2), C is for logical page 3 (1201L-3), D is for logical page 4 (1201L-4), and E is for logical page 5 (1201L-5).

In this case, on the physical paper, the print contents (F12P-1) of physical page serial No. 1 (12P-1), the print contents (F12P-2) of physical page serial No. 2 (12P-2), the print contents (F12P-3) of physical page serial No. 3 (12P-3), and the print contents (F12P-4) of physical page serial No. 4 (12P-4) are printed.

For a print job 2, the following applies. Of the print data of the print job 2, L is for logical page 1 (1202L-1), M is for logical page 2 (1202L-2), and N is for logical page 3 (1202L-3). In this case, on the physical paper, the print contents (F12P-5) of physical page serial No. 5 (12P-5) and the print contents (F12P-6) of physical page serial No. 6 (12P-6) are printed.

In FIGS. 11 and 12, the respective print contents (F11P-6, F11P-10, and F12P-4) corresponding to physical pages 11P-6, 11P-10, and 12P-4 are blank. Though the print job data runs out at the odd-number page before each of these physical pages, since duplex printing is performed, the physical page corresponding to the opposite surface of each of these odd-number pages is printed as a blank page.

As described above, in the tandem duplex print mode and the tandem single-side print mode with the inclusion of cases of N-up printing, each print job is printed starting with the first physical page to be printed having an odd physical page serial No. and ends with the last physical page to be printed having an even physical page serial No. For a subsequent print job, the physical page serial No. of the physical page to be printed first takes on the value obtained by adding 1 to the physical serial No. of the last physical page of the previous print job and is an odd number. This print job also ends with the physical page that is printed last having an even physical page serial No.

The processing procedure of the printing control unit 4500 shall now be described using FIGS. 7 and 8. The printing control unit 4500 instructs that the contents of the page buffer memory unit 4400, which were written for the respective pages by the drawing unit 4300, be output successively to the printer engines. Specifically, if a print page is to be printed by the first printer engine (701), a first printer engine print instruction (710) is carried out. If a print page is to be printed by the second printer engine (702), a second printer engine print instruction (750) is carried out. With the first embodiment, that a print page is to be printed by the first printer engine is judged from the page serial number. Also, that a print page is to be printed by the second printer engine is judged from the page serial number being an even number. In addition, the page serial numbers are assigned from the top of the print job.

By the first printer engine print instruction 710, a print instruction 712 is issued to the first printer engine 110 for each odd-number page (711). By the second printer engine print instruction 750, the following processes are carried out for each even-number page (751).

(1) If the page serial No. is N×S+2 (where N=0, 1, 2, . . . ) (752), the reading of the tandem check mark is instructed (754). If the tandem check mark is read successfully, the next step is entered. If the reading of the tandem check mark fails, that is, if a tandem relationship mismatch error occurs (801), a tandem relationship mismatch error process 810, illustrated in FIG. 8 is executed.

Here the reading of the tandem check mark is carried out as follows.

(i) A second engine I/F adapter 982 is instructed to read the tandem check mark using the first mark sensor 251 or the second mark sensor 252. Specifically, the instruction is carried out by setting the input/output signal of the second engine I/F adapter 982, to be described below using FIG. 9, as follows.

To instruct reading using the first mark sensor 251, the tandem check mark positions, read1_position_a, read1_position_b, are set and thereafter the read instruction signal, read1_order, for the first mark sensor is asserted.

To instruct reading using the second mark sensor 252, the tandem check mark positions, read2_position_a, read2_position_b, are set and thereafter the read instruction signal, read2_order, for the second mark sensor is asserted.

(ii) Whether or not the second engine I/F adapter 982 has recognized the tandem check mark at an appropriate timing and to be of the predetermined pattern in accordance with the instruction is checked and judged.

Specifically, in the case of reading by the first mark sensor 251, it is checked and judged whether or not, at an appropriate timing from the detection of the assertion of the read instruction signal, read1_order, for the first mark sensor, the tandem check mark is recognized to be of the predetermined pattern at the input tandem check mark position, read1_position_a, read1_position_b.

If the tandem check mark is recognized correctly, that is, if the tandem check mark is read successfully, the reading result, read1_result of the tandem check mark by the first mark sensor is output as 1.

If the tandem check mark is not recognized correctly, that is, if the reading of the tandem check mark fails, the reading result, read1_result, of the tandem check mark by the first mark sensor is output as 0. In this case of failure to read the tandem check mark (read1_result is 0), it is deemed that a tandem relationship mismatch error has occurred (801) and the tandem relationship mismatch error process 810, illustrated in FIG. 8, is executed.

In the case of reading by the second mark sensor 252, it is checked and judged whether or not, at an appropriate timing from the detection of the assertion of the read instruction signal, read2_order, for the second mark sensor, the tandem check mark is recognized to be of the predetermined pattern at the input tandem check mark position, read2_position_a, read2_position_b.

If the tandem check mark is recognized correctly, that is, if the tandem check mark is read successfully, the reading result, read2_result of the tandem check mark by the second mark sensor is output as 1.

If the tandem check mark is not recognized correctly, that is, if the reading of the tandem check mark fails, the reading result, read2_result, of the tandem check mark by the second mark sensor is output as 0. In this case of failure to read the tandem check mark (read2_result is 0), it is deemed that a tandem relationship mismatch error has occurred (801) and the tandem relationship mismatch error process 810, illustrated in FIG. 8, is executed.

(2) If the page serial No. is not N×S+2 (where N=0, 1, 2 . . . ) (753), the next step is entered.

(3) As the next step, a print instruction 755 for each even-number page is issued to the second printer engine 120.

The print instruction 712 and the print instruction 755 instruct, in regard to the page in the page buffer memory unit 4400 that is to be read, the reading of the contents of the page and the execution of printing by the printer engine in synchronization with the reading.

Figure 7A:
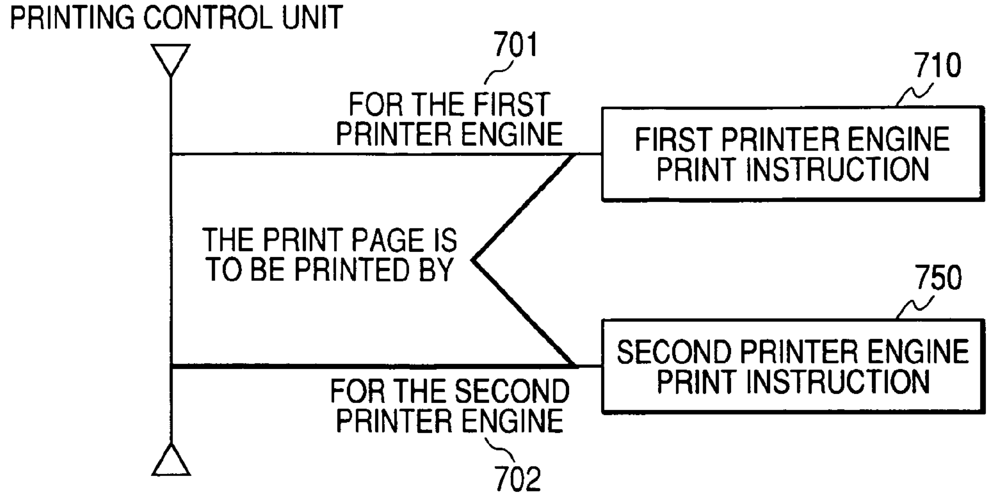
FIGS. 7A-7C show diagrams for describing the processing procedures of a printing control unit.
Figure 7B:
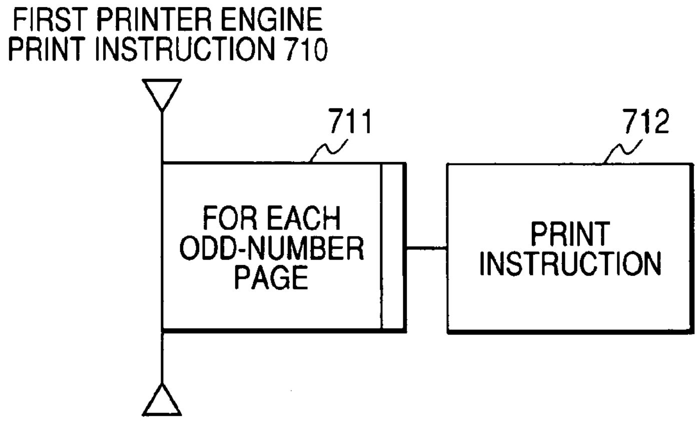
Figure 7C:
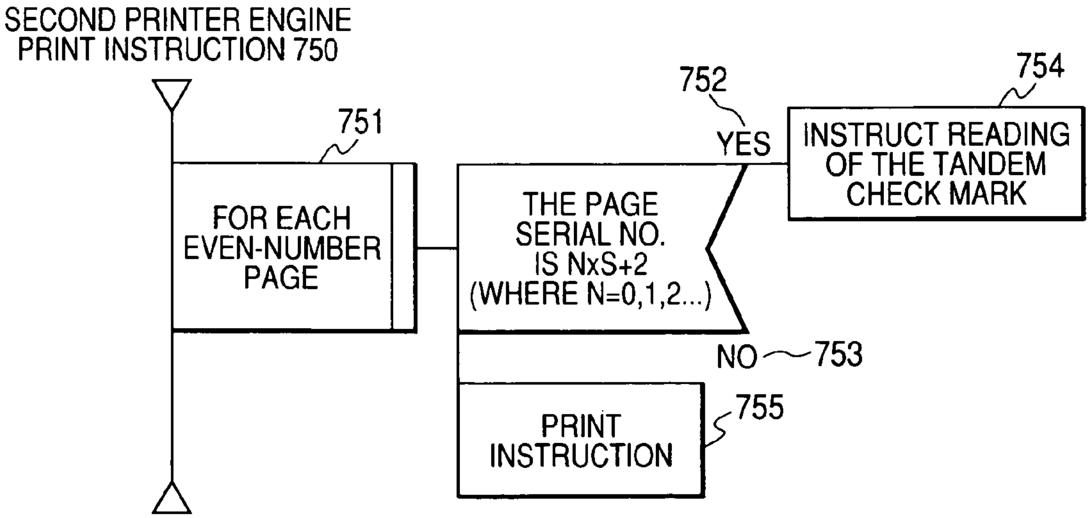
Figure 8:
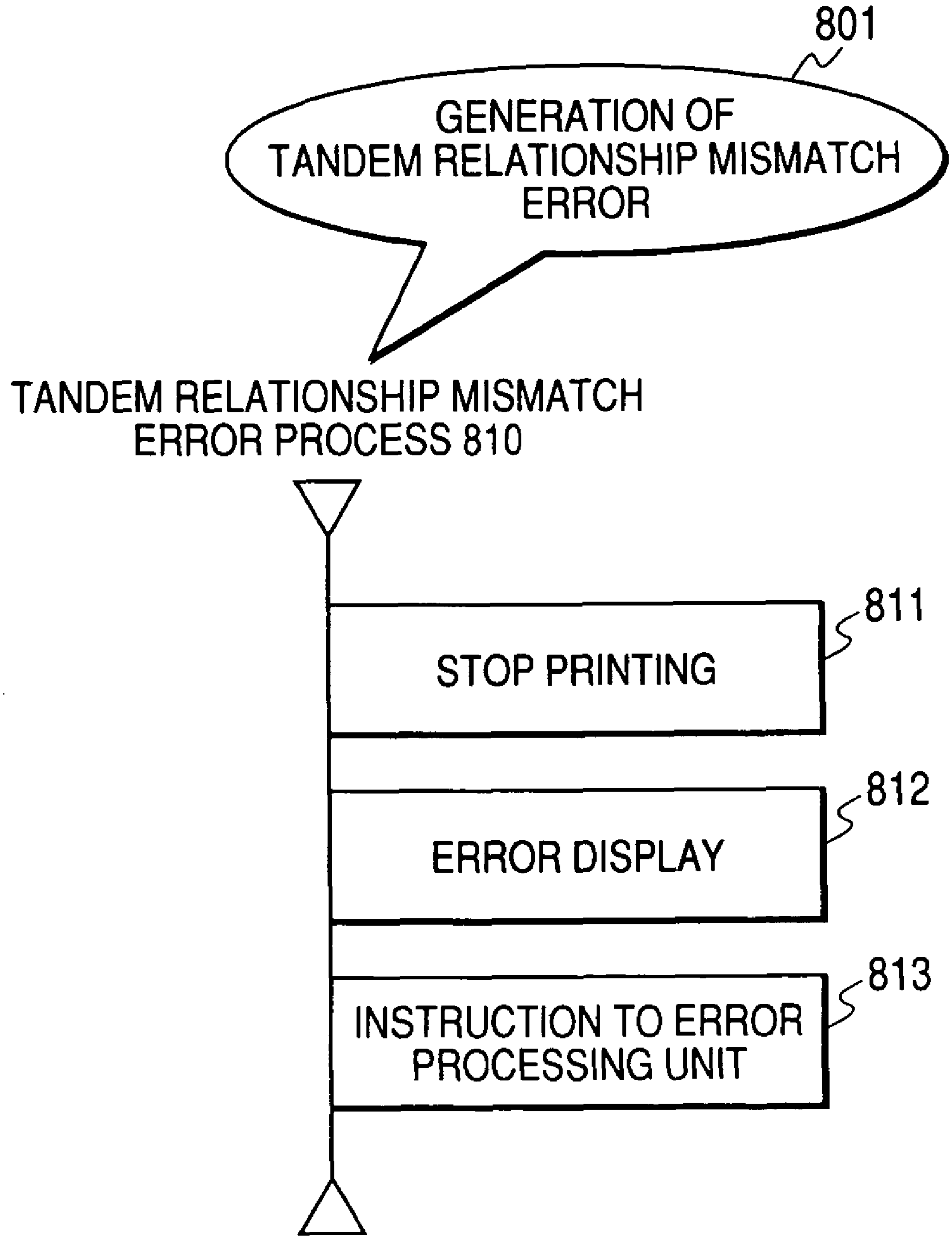
FIG. 8 shows a diagram for describing the processing procedure for a tandem relationship mismatch error.

In FIGS. 7 and 8, pages for which the page serial No. is odd were deemed to be for the first printer engine and pages for which the page serial No. is even were deemed to be for the second printer engine. By setting the initial value of the page serial No. to 0 instead of 1, the even-number pages may be deemed to be for the first printer engine and the odd-number pages may be deemed to be for the second printer engine.

Also, the tandem check mark read instruction 754 is issued at an appropriate timing in accordance with the printing speed (paper speed) and the paper length 320.

If the printing speed (paper speed) is high and the paper length is short, the tandem check mark read instruction 754 for the page serial No., N×S+2, may be issued as necessary at an earlier timing than when the page serial No. is N×S+2. For many continuous paper printers, since the printing speed is fixed for each device, the timing of the issuing of the tandem check mark read instruction 754 is determined in accordance with the paper length 320.

A method of setting the check page interval S shall now be described. Prior to this description, recovery lengths R shall be defined as follows.

Figure 10:
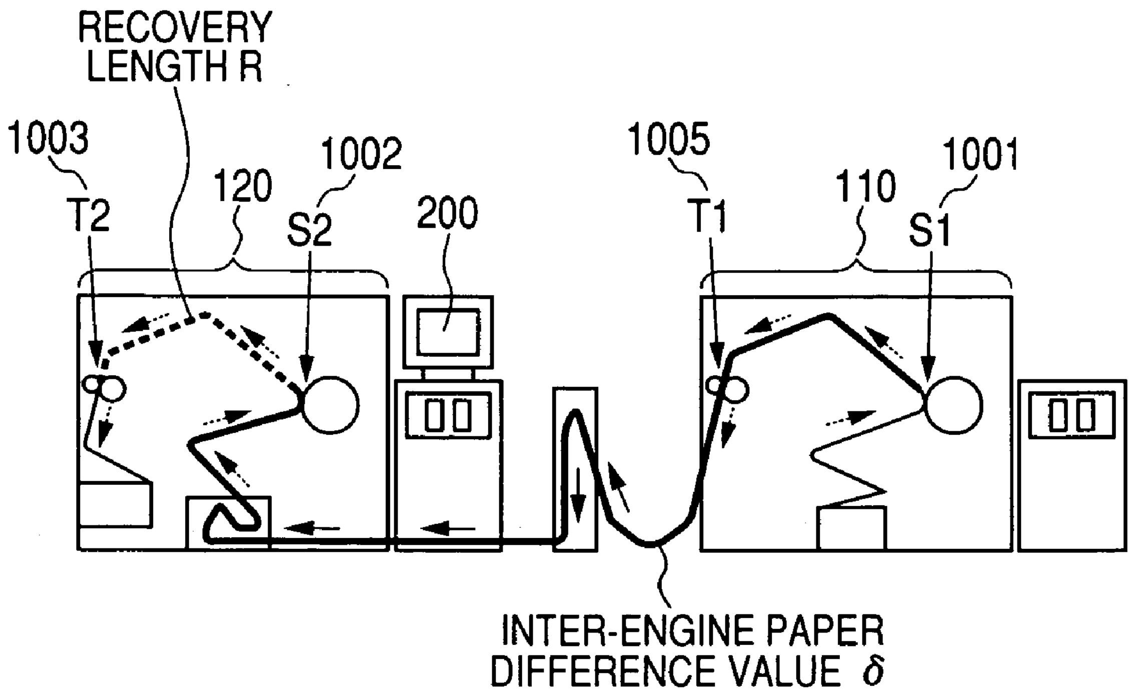
FIG. 10 shows a diagram for describing the paper path of the tandem continuous paper printer.

FIG. 10 is a diagram showing the paper path of the tandem continuous paper printer 100 of the first embodiment. In the FIGURE, the paper path from a print start point S1 (1001) of the first printer engine 110 to a print start point S2 (1002) of the second printer engine 120 is indicated by thick lines. The length of this path is the inter-engine paper difference value δ (220). The print start point is also referred to as the transfer point.

The paper interval, for which fixing by the fixing unit is not guaranteed when an emergency stop error occurs at the second printer engine 120, shall be the recovery length R2. The recovery length R2 is the length of the paper path from a fixing point T2 (1003) of the second printer to the print start point S2 (1002) of the second printer.

Likewise for the first printer engine 110, the recovery length R1 is the length of the paper path between T1 (1005) and S1 (1001). Here, since the first printer engine 110 and the second printer engine 120 are the same in basic specifications, it is deemed that the recovery length R1 of the first printer engine 110 is the same as the recovery length R2 of the second printer engine 120, that is, R1=R2=R. Also, the paper length 320 of each page printed by the tandem continuous paper printer shall be L. In FIG. 10, the recovery length R for the second printer engine 120 is the length indicated by the dotted line from the print start point S2 (1002) to the fixing point T2 (1003) of the second printer engine.

Here, the check page interval S is set by the following methods.

(1) Method 1

The check page interval S is set to the rounded down value of: recovery length R/paper length L.

(2) Method 2

The check page interval S is set to the rounded down value of: recovery length R/(2×paper length L).

The tandem front/back relationship check is performed at each check page interval S. When a relationship mismatch is detected twice consecutively, it is deemed that a tandem front/back relationship mismatch error has occurred. When a relationship mismatch is detected just once, it is not deemed that the tandem front/back relationship mismatch error has occurred.

Method 2 accommodates for cases where a detection error due to noise, etc., has occurred in regard to the first mark sensor 251, the second mark sensor 252, the first engine I/F adapter 981, the second engine I/F adapter 982, and cables associated with these, which are the hardware for reading the tandem check marks. That is, with Method 2, errors are accommodated by making use of the low probability of an error occurring twice consecutively.

The check by Method 2 and the check by Method 1 are thus practically the same in the interval of finding a mismatch, which is the rounded down value of: recovery length R/paper length L. The recovery length R is set, for example, to approximately 80 inches. The check page interval S may be set to the value less than or equal to the value, which is calculated by Method 1 or Method 2. In this case is checked in shorter period and the tandem front/back relationship error mismatch can be detected earlier than in the case that the check page interval S is set to be the value calculated by Method 1 or Method 2.

The selection of the first mark sensor and the second mark sensor is carried out as follows. The printing control unit 4500 uses the second engine control unit 4552 to instruct which mark sensor is to be used in accordance with whether the print mode 4710 is the tandem duplex print mode or the tandem single-side print mode. Once instructed, the same mark sensor is used until another instruction is made. In the case of the tandem duplex print mode, the use of the first mark sensor 251 is instructed. In the case of the tandem single-side print mode, the use of the second mark sensor 252 is instructed.

The details of the tandem relationship mismatch error process 810 shall now be described using FIG. 8. In this process, first the printing is stopped (811). Then as an error display, the error code corresponding to the tandem relationship mismatch error and a message expressing the contents thereof are displayed on a display unit 940 (812). An individual error process is then instructed to the error processing unit 4700 (813). Here, in accordance with 813, the error processing unit 4700 executes (1) the reporting of the error information to the upper-level computer 130 and (2) an error recovery printing.

The error recovery printing is executed, for example, as follows.

Suppose that when the relationship of page 25 (505) and page (26) (506) is checked as shown in FIG. 5, a mismatched relationship is detected. Furthermore, suppose that the relationship for the pair of page 13 (503) and page 14 (504) that precedes the above pages by just the check page interval S is a matched relationship.

(i) The paper is set again on the first printer engine 110 and the second printer engine 120. The inter-engine paper difference value δ between the two engines is then reset and the printing control unit 4500 associates the pages between the printer engines in accordance with the inter-engine paper difference value δ.

(ii) In the present relationship check of page 25 (505) and page 26 (506) in response to the instruction of 754, a matched relationship was not found between the odd-number page and the even-number page. A matched relationship was realized in the check prior to the checking of these pages. Reprinting is thus executed for pages from page 15 (507) onwards.

(iii) In this reprinting, the expanded data stored in page buffer memory unit 4400 are used to perform printing of the pages from page 15, which is the reprint starting page, onwards.

In the case where an emergency stop error occurs in the tandem duplex print mode or the tandem single-side print mode, the expanded dot image data stored in the page buffer memory unit 4400 for the physical pages corresponding to the total length of the inter-engine paper difference value δ and the recovery length R are used to perform the error recovery printing. In this error recovery printing, first the stored expanded dot image data are used to perform printing by the first printer engine. Then after a lag of just the inter-engine paper difference value δ, the printing by the second printer engine can be performed at the same time as the printing by the first printer engine.

The positioning of the first mark sensor 251 and the second mark sensor 252 for reading the tandem check marks shown in FIG. 2 shall now be described based on the details described using FIG. 10. The first mark sensor 251 and the second mark sensor 252 are positioned between the fixing point T1 (1005) of the first printer engine and the transfer point S2 (1002) of the second printer engine. These are preferably positioned before the exposure point (not shown) of the second printer engine. In the first embodiment, the sensors are positioned on the second printer engine at positions, located prior to the exposure point of the second printer engine and where there are spaces for installation of the sensors, as shown in FIG. 2.

Figure 9:
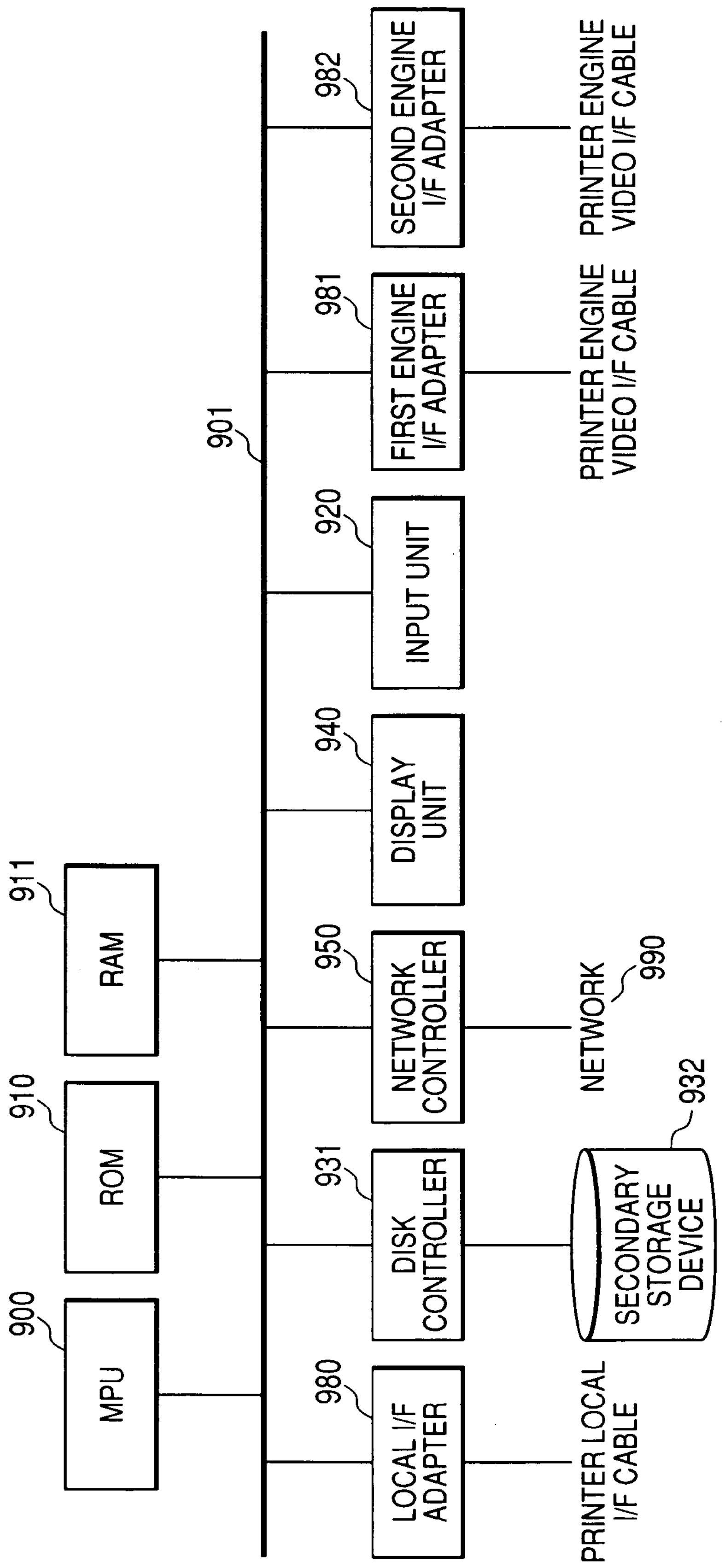
FIG. 9 shows a hardware block diagram of the printer controller.

The hardware arrangement of the printer controller 200 shall now be described using FIG. 9. The printer controller 200 comprises an MPU 900, a system bus 901, a ROM 910, a RAM 911, the input unit 920, the display unit 940, a disk controller 931, a secondary storage device 932, a network controller 950, a local I/F adapter 980, the first engine I/F adapter 981, and the second engine I/F adapter 982.

The system bus 901 is a communication member for the various input/output signals (address signals, data signals, and other control signals) of the MPU 900.

The MPU 900 performs, via the system bus 901, input and output with respect to peripheral devices, such as the secondary storage device 932, the input unit 920, the display unit 940, and the network 990, and memories, such as the ROM 910 and the RAM 911.

The secondary storage device 932 is connected to the system bus 901 via the disk controller 931. The system bus 901 of this printer controller is connected via the network controller 950 to the network 990, which is a LAN or WAN, etc.

As the physical I/F of the network 990, Ethernet (registered trademark), Token-Ring, FDDI (Fiber Distributed Data Interface), ATM (Asynchronous Transfer Mode), or ISDN (Integrated Services Digital Network), etc., is used, and an appropriate hardware logic is installed in the network controller 950 in accordance with the type of the physical I/F used.

The local I/F adapter 980 is an adapter for directly connecting the printer controller 200 to the computer 132. In this case, Centronix, SCSI, fiber channel, IEEE1394, USB, RS-232C, or RS-422/423, etc., is used as the interface with the computer and connection is made using printer local I/F adapter.

The first engine I/F adapter 981 is an adapter for interfacing with the first printer engine 110. A video interface is used as the interface between the first engine I/F adapter 981 and the first printer engine 110.

The second engine I/F adapter 982 is an adapter for interfacing with the second printer engine 120. A video interface is used as the interface between the second engine I/F adapter 982 and the second printer engine 120.

For reading of the tandem check marks, the following input and output signals were prepared for the second engine I/F adapter 982.

(i) A signal for the setting of read1_position_a, read1_position_b, which are the tandem check mark positions for the first mark sensor 251 by the MPU 900. Here, the tandem check mark positions, read1_position_a, read1_position_b, correspond to a, b in FIG. 3.

(ii) The signal, read1_order, by which the MPU 900 instructs the reading of a tandem check mark by the first mark sensor 251.

(iii) The signal, read1_result, for returning the tandem check mark reading result of the first mark sensor 251 to the MPU. Here, read1_result returns one of the two values of 1 and 0. read1_result=1 indicates that the reading of the tandem check mark was successful and read1_result=0 indicates failure of the reading of the tandem check mark.

(iv) A signal for the setting of read2_position_a, read2_position_b, which are the tandem check mark positions for the second mark sensor 252 by the MPU 900. Here, the tandem check mark positions, read2_position_a, read2_position_b, correspond to a, b in FIG. 3.

(v) The signal, read2_order, by which the MPU 900 instructs the reading of a tandem check mark by the second mark sensor 252.

(vi) The signal, read2_result, for returning the tandem check mark reading result of the first mark sensor 252 to the MPU. Here, read2_result returns one of the two values of 1 and 0. read2_result=1 indicates that the reading of the tandem check mark was successful and read2_result=0 indicates failure of the reading of the tandem check mark.

An initial startup program (also referred to as the "IPL (Initial Program Loading) program") for the printer controller 200 and a portion of character fonts are stored in the ROM 910.

In the RAM 911 are stored (a) a control program for the printer controller, (b) the remainder of the character fonts, (c) various buffer memory contents, (d) various management tables, etc. Of these, (a) and (b) are stored by loading from the secondary storage device 932 in the IPL program. Also, (a) and (b) may be stored instead in advance in the ROM 910 and not stored in the RAM 911. Or oppositely, all of the character fonts may be stored in the RAM 911 so that none of the character fonts are stored in the ROM 910.

The input unit 920 is used for the operator to make inputs into the printer controller 200. A keyboard, mouse, switch, touch panel, etc., may be used as the input member.

The display unit 940 is used for display of the states of printer controller and the setting values. A liquid crystal panel, CRT, or other type of panel or LED's, etc., may be used as the display member.

The first engine I/F adapter 981 performs input/output processes with the first printer engine 110 in accordance with instructions of the MPU 900. The second engine I/F adapter 982 performs input/output processes with the second printer engine 120 in accordance with instructions of the MPU 900.

The first engine I/F adapter 981 performs a process of reading the contents of the page buffer memory unit 4400 into the first printer engine 110. The second engine I/F adapter 982 performs a process of reading the contents of the page buffer memory unit 4400 into the second printer engine 120. These reading processes are carried out using a DMA (Direct Memory Access) function incorporated in each of the first engine I/F adapter 981 and the second engine I/F adapter 982.

At the point at which the reading of the dot image data for one page among the pages in the page buffer memory unit 4400 is ended, the first engine I/F adapter 981 asserts an interrupt signal (a portion of the bus signals for the MPU 900) with respect to the MPU 900 and makes the MPU 900 start a read-complete interrupt process of the page buffer memory unit 4400.

Likewise, at the point at which the reading of the dot image data for one page among the pages in the page buffer memory unit 4400 is ended, the second engine I/F adapter 982 asserts an interrupt signal (a portion of the bus signals for the MPU 900) with respect to the MPU 900 and makes the MPU 900 start the read-complete interrupt process of the page buffer memory unit 4400.

In the read-complete interrupt process, the page for which reading has been completed has become vacant and can be used for the drawing of the next page is set in the management table concerning the page buffer memory unit 4400, and tasks of the drawing unit 4300, etc., which are awaiting for the vacancy of the page inside page buffer memory unit 4400, are released from the vacancy waiting state.

The first engine I/F adapter 982 and the second engine I/F adapter 981 perform parallel/serial conversion to convert the dot image data that have been read to the serial format and then performs output to the first printer engine 110 or the second printer engine 120 using image transfer signals between the corresponding printer engine. The image transfer signals may be transferred as they are in the parallel format without performing parallel/serial conversion. Also if necessary, conversion from a compressed format to a non-compressed format may be performed prior to the parallel/serial conversion.

The first engine I/F adapter 981 and the second engine I/F adapter 982 furthermore uses command transmitting and status receiving signals with the corresponding first printer engine 110 or the second printer engine 120 to perform inquiry or transmitting of a command for instruction to the first printer engine 110 or the second printer engine 120 and to receive response statuses from the first printer engine 110 or the second printer engine 120.

There are two methods of implementing the first engine I/F adapter 981 and the second engine I/F adapter 982: a method of mounting sub-MPUs dedicated to the adapters and a method of not mounting sub-MPUs and making the necessary control processes be performed at the MPU 900. Either can be used to realize the installation.

As illustrated by the present embodiment, the first printer engine 110 prints the tandem check marks 312 at fixed page intervals (check page intervals S), and printing by the second printer engine 120 checks for the existence of the tandem check marks 312.

By this check, whether or not there is a mismatch in the page relationship of the printing by the first printer engine 110 and the printing by the second printer engine 120 can be verified. If there is a mismatch in the relationship, the error process is performed to notify the operator or the user and enable the relationship between the two engines to be put in a matched relationship again and enable the relationship mismatch portions and onwards of the print job to be printed again. The reliability of the tandem printing system can thus be improved.

Embodiment 2

A second embodiment shall now be described using FIGS. 13 and 14. This second embodiment is a modification example of the first embodiment. Here, the pattern shapes of the tandem check marks are made not all the same as in the first embodiment but a plurality of pattern shapes are repeated.

When the tandem check marks are all made the same in pattern shape, the following problems occur.

(1) When the paper deviates by just the check page interval S, the tandem relationship mismatch error cannot be detected.

(2) Though the possibility of this detection error can be lessened by making the check page interval S long, the cycle of the relationship check becomes long and the timing of detection of the tandem relationship mismatch error becomes slow. When the timing of detection of this error becomes slow, since a corresponding amount of extra pages must be printed in the printing for error recovery, time and paper are wasted.

With the second embodiment, the respective patterns in a pattern series of a plurality of pattern shapes are repeated in order and used as tandem check patterns. The problems of (1) and (2) are thereby resolved.

Figure 13:
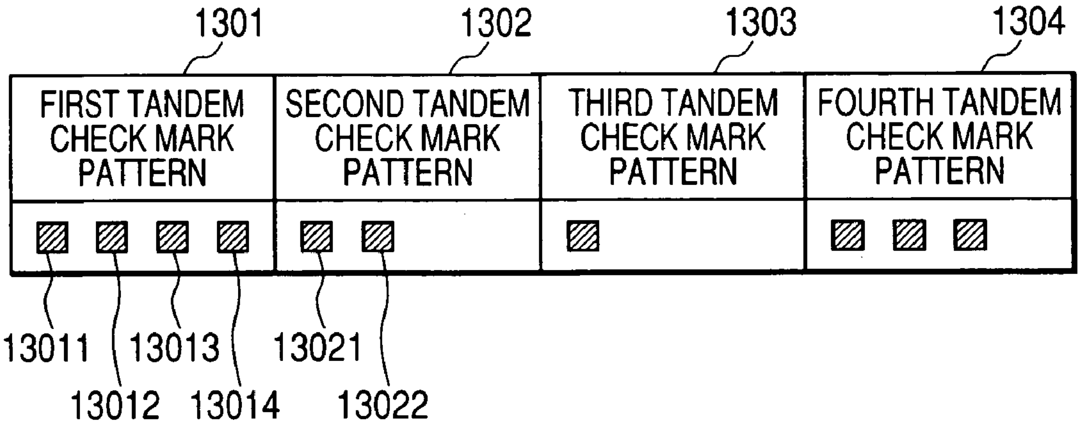
FIG. 13 shows a diagram for describing tandem check mark patterns of a second embodiment.
Figure 14:
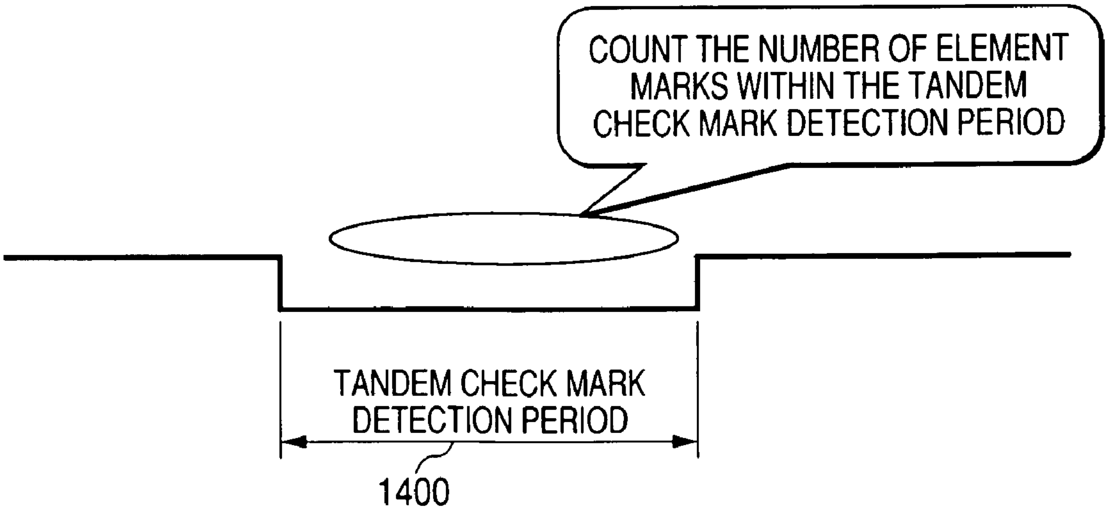
FIG. 14 shows a diagram for describing the detection period and timing of the tandem check mark patterns of the second embodiment.

Specifically, as the tandem check marks 312 in FIG. 3, for example, each of the four pattern shapes (1301, 1302, 1303, and 1304) shown in FIG. 13 is used as a tandem check pattern and these four patterns are used repeatedly.

In the present example, a first tandem check mark pattern 1301, a second tandem check mark pattern 1302, a third tandem check mark pattern 1303, and a fourth tandem check mark pattern 1304 are formed of four, two, one, and three element marks, respectively.

Here, element marks refer, for example in the case of the first tandem check mark pattern, to the four black patterns (13011, 13012, 13013, and 13014) that make up the tandem check mark pattern. The first tandem check mark pattern thus comprises four element marks. The second tandem check mark pattern comprises two element marks (13021 and 13022).

The respective tandem check marks, for example, the four element patterns 13011, 13012, 13013, and 13014 making up the first tandem check mark pattern 1301 are positioned in that order in the paper conveying direction. These may instead be positioned in the reverse order, that is, in the order of 13014, 13013, 13012, and 13011 in the paper conveying direction. Also, the four element patterns 13011, 13012, 13013, and 13014 may be positioned in a direction orthogonal to the paper conveying direction. The same specifications as those of the first tandem check mark pattern 1301 applies to the other tandem check mark patterns, that is the second tandem check mark pattern 1302, the third tandem check mark pattern 1303, and the fourth tandem check mark pattern 1304.

The reading of the respective tandem check mark patterns is executed as follows in accordance with the tandem check mark read instruction 754.

(i) The tandem check marks are detected using the first mark sensor or the second mark sensor.

(ii) Based on this detection, whether or not the tandem check marks are recognized at an appropriate timing and to be of the predetermined pattern is judged. Specifically, how many of the element marks, which make up each tandem check pattern, is detected within a tandem check mark detection period 1400 is counted. If the number of the counted element marks matches the predetermined number, it is deemed that the tandem check marks are recognized correctly, that is, the reading of the tandem check marks is successful. If the number of the counted element marks does not match the predetermined number, it is deemed that the tandem check marks are not recognized correctly, that is, the reading of the tandem check marks failed.

In the description of the second embodiment onwards, the first tandem check mark pattern, the second tandem check mark pattern, the third tandem check mark pattern, and the fourth tandem check mark pattern may also be referred to as tandem check marks, as tandem check mark patterns or as tandem check patterns.

In the present embodiment, since the tandem check mark patterns are repeated in the manner of: the first pattern, the second pattern, the third pattern, the fourth pattern, the first pattern, the second pattern, the third pattern, the fourth pattern . . . , a check of whether or not the number of element marks are counted in the manner of 4, 2, 1, 3, 4, 2, 1, 3, . . . is performed in the reading of the tandem check mark pattern. If in the reading of a certain tandem check mark, element marks of a number that deviates from this repetition are counted, it is deemed that a tandem relationship mismatch error has been detected. In the present embodiment, the intervals between the element check marks that make up the respective tandem check mark patterns is not noted.

The counting and the judgment of whether or not the counted number of element marks matches the predetermined number are performed at the second engine I/F adapter 982. The same can also be realized by transferring the counting and the judgment to processes of the MPU 900.

Embodiment 3

A third embodiment shall now be described using FIGS. 15 and 16. This third embodiment is a modification example of the second embodiment. In this embodiment, a plurality of pattern shapes are repeated as the pattern shapes of the tandem check marks as in the second embodiment, and each pattern shape is arranged as a binary code. Thus even when the same number of element marks are used, the number of pattern shapes that can be identified as tandem check marks can be increased and the possibility of erroneous detection can be reduced further in comparison to the second embodiment.

Figure 15:
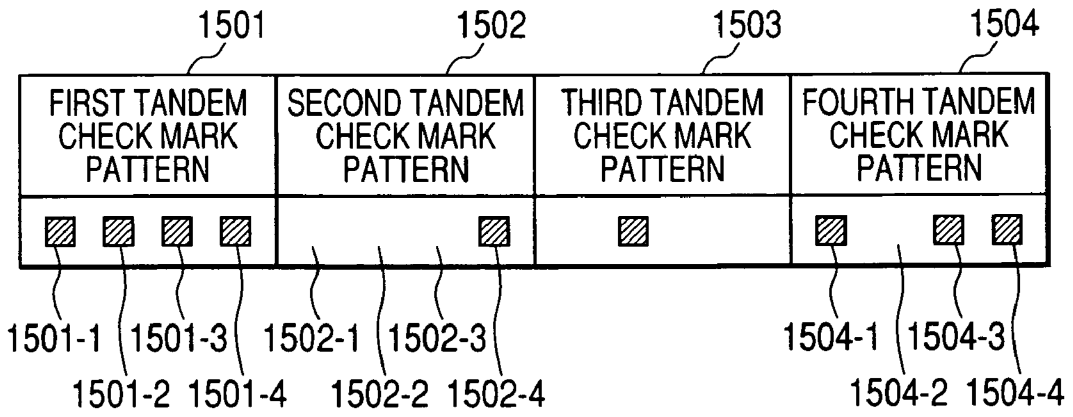
FIG. 15 shows a diagram for describing tandem check mark patterns of a third embodiment.

Specifically, as the tandem check marks 312 in FIG. 3, for example, each of the four pattern shapes (1501, 1502, 1503, and 1504) shown in FIG. 15 is used as a tandem check pattern and these four patterns are used repeatedly.

In the present example, each of a first tandem check mark pattern 1501, a second tandem check mark pattern 1502, a third tandem check mark pattern 1503, and a fourth tandem check mark pattern 1504 is formed of a plurality (four in the case of FIG. 15) of element mark portions.

For example, the first tandem check mark pattern 1501 is made up of a first element mark portion 1501-1, a second element mark portion 1501-2, a third element mark portion 1501-3, and a fourth element mark portion 1501-4. With each of the element mark portions 1501-1, 1501-2, 1501-3, and 1501-4, a binary value is expressed by the existence or non-existence of element marks. 1501-1 expresses the $2^3$ bit, 1501-2 expresses the $2^2$ bit, 1501-3 expresses the $2^1$ bit, and 1501-4 expresses the $2^0$ bit. Each tandem check patterns thus expresses a binary number of plural digits. The same arrangement as that of the first tandem check mark pattern 1501 applies to the second tandem check mark pattern 1502, the third tandem check mark pattern 1503, and the fourth tandem check mark pattern 1504. For example, in the fourth tandem check mark pattern 1504, 1504-1 expresses the $2^3$ bit, 1504-2 expresses the $2^2$ bit, 1504-3 expresses the $2^1$ bit, and 1504-4 expresses the $2^0$ bit.

In FIG. 15, the first tandem check mark pattern 1501, the second tandem check mark pattern 1502, the third tandem check mark pattern 1503, and the fourth tandem check mark pattern 1504 express (1111), (0001), (0100), and (1011), respectively.

The respective tandem check marks, for example, the four element mark portions 1501-1, 1501-2, 1501-3, and 1501-4 making up the first tandem check mark pattern 1501 are positioned in that order in the paper conveying direction. These may instead be positioned in the reverse order, that is, in the order of 1501-4, 1501-3, 1501-2, and 1501-1 in the paper conveying direction. Also, the four element mark portions 1501-1, 1501-2, 1501-3, and 1501-4 may be positioned in a direction orthogonal to the paper conveying direction. The same specifications as those of the first tandem check mark pattern 1501 applies to the other tandem check mark patterns, that is, the second tandem check mark pattern 1502, the third tandem check mark pattern 1503, and the fourth tandem check mark pattern 1504.

In executing the reading of each tandem check mark pattern in accordance with the tandem check mark read instruction 754, a tandem check mark detection period 1600 is divided into the intervals 1601, 1602, 1603, and 1604 in correspondence with the number of bits making up the tandem check mark pattern and, in each interval, whether or not there is an element mark at the element mark portion of the corresponding each digit of the binary value pattern is detected.

Figure 16:
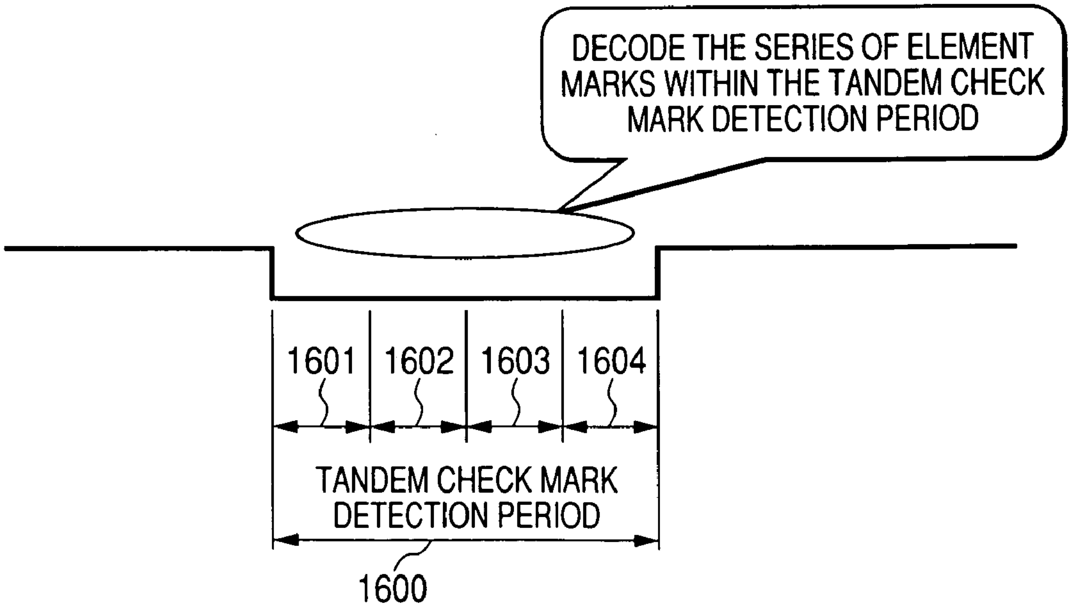
FIG. 16 shows a diagram for describing the detection period and timing of the tandem check mark patterns of the third embodiment.

As shown in FIG. 16, with the present example, the existence/non-existence of the $2^3$ bit is detected in the interval 1601, the existence/non-existence of the $2^2$ bit is detected in the interval 1602, the existence/non-existence of the $2^1$ bit is detected in the interval 1603, and the existence/non-existence of the $2^0$ bit is detected in the interval 1604. The binary numbers expressed by the respective tandem check patterns 1501, 1502, 1503, and 1504 are thus recognized as numerical values. Whether or not these recognized numerical values are the predetermined numerical values is then judged.

The recognition of the tandem check patterns as binary numbers and the judgment of whether or not the numerical values recognized are the predetermined numerical values are carried out by the second engine I/F adapter 982. The same can be realized by transferring the recognition as binary numbers and the judgment to processes of the MPU 900.

If a recognized numerical value matches the corresponding predetermined numerical value, it is deemed that the tandem check marks are recognized correctly, that is, the reading of the tandem check marks is successful. If the recognized numerical value does not match the predetermined numerical value, it is deemed that the tandem check marks are not recognized correctly, that is, the reading of the tandem check marks failed.

In the present embodiment, since the tandem check mark patterns are repeated in the manner of: the first pattern, the second pattern, the third pattern, the fourth pattern, the first pattern, the second pattern, the third pattern, the fourth pattern . . . , a check of whether or not the numerical values are read in the manner of (1111), (0001), (0100), (1011), (1111), (0001), (0100), (1011), . . . is performed in the reading of the tandem check pattern. If in the reading of a certain tandem check mark, a numerical value that deviates from this repetition is read, it is deemed that a tandem relationship mismatch error has been detected.

Embodiment 4

A fourth embodiment shall now be described using FIGS. 17 and 18. This embodiment is a modification example of the third embodiment. With the third embodiment, the (0001) of the second tandem check mark pattern 1502 and the (0100) of the third tandem check mark pattern 1503 cannot be distinguished readily by human vision. Each of the second tandem check mark pattern 1502 and the third tandem check mark pattern 1503 is made up of a single element mark (black pattern) and since this element mark is isolated, the difference in position cannot be distinguished readily by human vision.

In order to resolve this problem, with the fourth embodiment, the element mark of the $2^3$ bit is always printed as a start bit to enable the binary pattern that follows to be recognized readily even by human vision.

Figure 17:
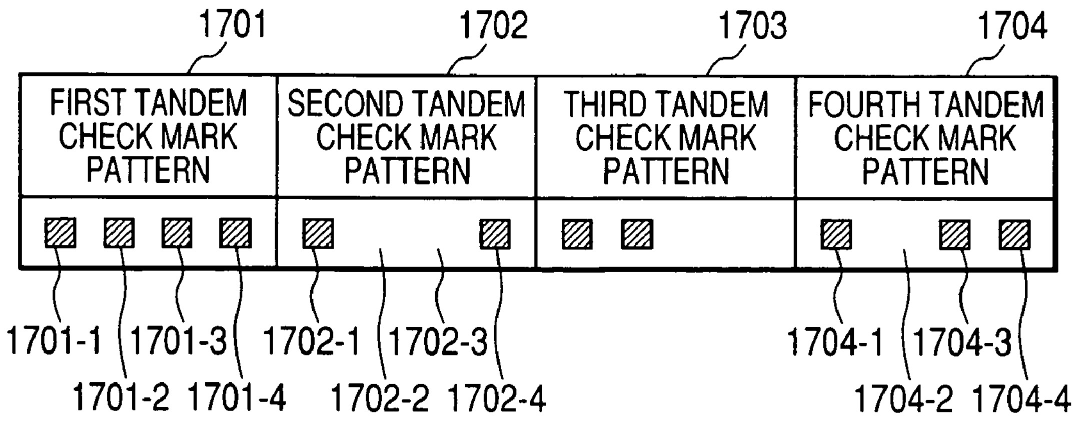
FIG. 17 shows a diagram for describing tandem check mark patterns of a fourth embodiment.

Specifically, as the tandem check marks 312 in FIG. 3, for example, the four pattern shapes (1701, 1702, 1703, and 1704) shown in FIG. 17 are repeated. In the present example, a three-bit numerical pattern is expressed by the respective pattern shapes of a first tandem check mark pattern 1701, a second tandem check mark pattern 1702, a third tandem check mark pattern 1703, and a fourth tandem check mark pattern 1704. Here, 1701, 1702, 1703, and 1704 express (111), (001), (100), and (011), respectively.

In FIG. 17, since a start bit is always set, each of the second tandem check mark pattern 1702 and the third tandem check mark pattern 1703 is made up of two element marks (black patterns). Here, whereas the two element marks of the second tandem check mark pattern 1702 are separated, the two element marks of the third tandem check mark pattern 1703 are adjacent each other. This difference can be readily distinguished by human vision.

Figure 18:
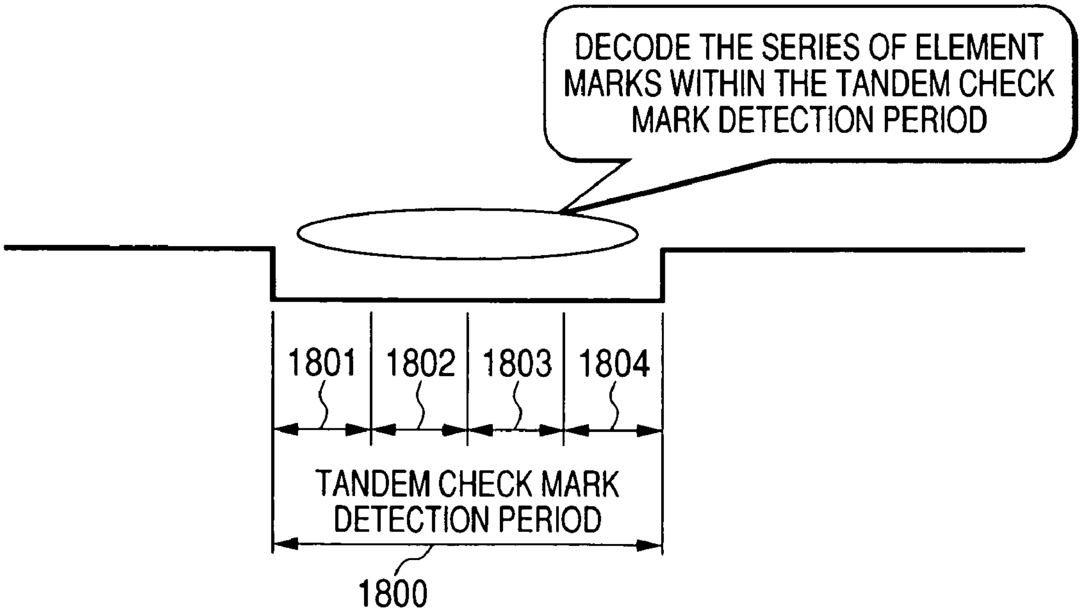
FIG. 18 shows a diagram for describing the detection period and timing of the tandem check mark patterns of the fourth embodiment.

As shown in FIG. 18, in executing the reading of each tandem check mark pattern in accordance with the tandem check mark read instruction 754, a tandem check mark detection period 1800 is divided into the intervals 1801, 1802, 1803, and 1804 in correspondence with the number of bits making up the tandem check mark pattern and, in each interval, whether or not there is an element mark at the element mark portion making up each digit (including the start bit) of the binary value pattern is detected.

With the present example, the existence/non-existence of the start bit is detected in the interval 1801, the existence/non-existence of the $2^2$ bit is detected in the interval 1802, the existence/non-existence of the $2^1$ bit is detected in the interval 1803, and the existence/non-existence of the $2^0$ bit is detected in the interval 1804.

In the present embodiment, since the tandem check mark patterns are repeated in the manner of: the first pattern, the second pattern, the third pattern, the fourth pattern, the first pattern, the second pattern, the third pattern, the fourth pattern . . . , a check of whether or not the numerical values are read in the manner of (111), (001), (100), (011), (111), (001), (100), (011), . . . is performed in the reading of the tandem check mark pattern. If in the reading of a certain tandem check mark pattern, a numerical value that deviates from this repetition is read, it is deemed that a tandem relationship mismatch error has been detected.

The recognition of the tandem check patterns as binary numbers and the judgment of whether or not the numerical values recognized are the predetermined numerical values are carried out by the second engine I/F adapter 982. The same can be realized by transferring the recognition as binary numbers and the judgment to processes of the MPU 900.

The second embodiment, the third embodiment, and the fourth embodiment may be realized in the following manner as well:

(1) The types of pattern shapes are not restricted to four types and an arbitrary number of patterns may be repeated.

(2) With the tandem check patterns of the second embodiment, the third embodiment, and the fourth embodiment, all intervals between patterns repeated in the manner of: the first pattern, the second pattern, the third pattern, the fourth pattern, the first pattern, the second pattern, the third pattern, the fourth pattern . . . are simplified and made the same check page intervals A. The interval between patterns in the series of: the first pattern, the second pattern, the third pattern, the fourth pattern may be made the check page interval A and the interval between the fourth pattern and the next first pattern may be set to an interval B that differs from A. The series from the first pattern to the fourth pattern shall be referred to as a pattern set. B is the interval between a pattern set and the next pattern set.

Embodiment 5

A fifth embodiment shall now be described. This embodiment is a modification example of the first embodiment. Though the pattern shape of all tandem check marks is made the same pattern shape as in the first embodiment, the check page interval S is made random. In the case where the check page interval S is fixed, the following problems occur since the check cycle is repeated at that value:

(1) When the paper deviates by just the check page interval S, the tandem relationship mismatch error cannot be detected.

(2) Though the possibility of this detection error can be lessened by making the check page interval S long, the cycle of the relationship check becomes long and the timing of detection of the tandem relationship mismatch error becomes slow. When the timing of detection of this error becomes slow, since a corresponding amount of extra pages must be printed in the printing for error recovery, time and paper are wasted.

With the present embodiment, the above problems (1) and (2) are resolved by making the check page interval S random. In regard to (1), the possibility of deviation by the check page interval S can be lessened by randomization. Also in regard to (2), randomization enables a detection precision, equivalent to that obtained when the check page interval S is made long, to be obtained without making the check page interval S long.

The randomization of the check page interval S is carried out, for example, as follows:

$$S2 = S1 + R \quad \text{(Equation 2)}$$

In the above,

S2: check page interval after randomization

S1: original check page interval

R: random variable

The same respective processes as those of the first embodiment are carried out using S2 as the check page interval S. For example, in the example of FIG. 5, S2 is calculated with S1=12 and R=a random variable between −5 to +5. The random variable may be generated using, for example, the pseudo-random number function, rand( ), in C language.

By combining (a) the randomization of the check page interval of the fifth embodiment and (b) the making of the pattern shapes plural of the second embodiment, the third embodiment, or the fourth embodiment, a synergistic effect of the method of (a) and the method of (b) can be obtained and the possibility of detection errors of the tandem relationship mismatch error can be lowered significantly.

In addition to continuous paper with sprocket holes, paper without sprocket holes can be used in this invention. The above-embodiments can be realized in the same manner regardless of whether paper with sprocket holes or paper without sprocket holes is used.

Specifically, for both paper with sprocket holes and paper without sprocket holes, the tandem check marks 312 are printed by the first printer engine 110 and these are read by the first mark sensor or the second mark sensor. Whether or not there is mismatching in the page relationship of the printing by the first printer engine 110 and the printing by the second printer engine 120 can thereby be verified.

In using paper without sprocket holes, a pin-less paper conveying mechanism is installed. By using paper without sprocket holes, the costs for processing and cutting the sprocket hole portions and the perforations can be eliminated. Normally, when the above-described roll paper supplying device is used, paper without sprocket holes is used.

The above-embodiments can likewise be realized even when three or more printer engines are connected in tandem.

Furthermore, the printing mechanism of this invention is not limited to electrophotography and this invention can be applied to various other methods, such as inkjet methods.

[FIG. 1]

170 Post-processing device

Network

[FIG. 2]

110 First printer engine

120 Second printer engine

150 Paper inverting unit

220 Inter-engine paper difference value δ

251 First mark sensor

252 Second mark sensor

[FIG. 3]

301 First page

302 (S+1)-th page

311 Printable region

312 Tandem check mark

318 Printable paper width

319 Paper width

320 Paper length

[FIG. 4]

Upper-level computer

110 First printer engine

120 Second printer engine

200 Printer controller

4100 Upper-level interface unit

4300 Drawing unit

4400 Page buffer memory unit

4500 Printing control unit

4551 First engine control unit

4552 Second engine control unit

4600 User interface control unit

4610 Print mode setting unit

4700 Error processing unit

4710 Print mode

[FIG. 5]

Page 1

Check

[FIG. 6]

Drawing unit

601 For each page

602 PDL drawing

The page serial No. is N×S+1 (where N=0, 1, 2 . . . )

605 Draw mark.

[FIG. 7A]

Printing control unit

The print page is to be printed by

701 For the first printer engine

702 For the second printer engine

710 First printer engine print instruction

750 Second printer engine print instruction

[FIG. 7B]

First printer engine print instruction 710

711 For each odd-number page

712 Print instruction

[FIG. 7C]

Second printer engine print instruction 750

751 For each even-number page

The page serial No. is N×S+1 (where N=0, 1, 2 . . . )

754 Instruct reading of the tandem check mark.

755 Print instruction

[FIG. 8]

801 Generation of tandem relationship mismatch error

810 Tandem relationship mismatch error process

811 Stop printing.

812 Error display

813 Instruction to error processing unit.

[FIG. 9]

901 System bus

910 ROM

911 RAM

920 Input unit

931 Disk controller

932 Secondary storage device

940 Display unit

950 Network controller

980 Local I/F adapter Printer local I/F cable

981 First engine I/Fadapter Printer engine video I/F cable

982 Second engine I/F adapter Printer engine video I/F cable

990 Network

[FIG. 10]

Recovery length R

Inter-engine paper difference value δ

[FIG. 11]

In the 1UP case

Logical page

Print data for print job 1

Physical page serial No.

Physical paper

First printer engine

Second printer engine

Blank

Logical page

Print data for print job 2

Physical page serial No.

Physical paper
First printer engine
Second printer engint
Blank

[FIG. 12]

In the 2UP case
Logical page
Print data for print job 1
Physical page serial No.
Physical paper
First printer engine
Second printer engine
Blank
Logical page
Print data for print job 2
Physical page serial No.
Physical paper
First printer engine
Second printer engine
Blank

[FIG. 13]

1301 First tandem check mark pattern
1302 Second tandem check mark pattern
1303 Third tandem check mark pattern
1304 Fourth tandem check mark pattern

[FIG. 14]

Count the number of element marks within the tandem check mark detection period.
1400 Tandem check mark detection period

[FIG. 15]

1501 First tandem check mark pattern
1502 Second tandem check mark pattern
1503 Third tandem check mark pattern
1504 Fourth tandem check mark pattern

[FIG. 16]

Decode the series of element marks within the tandem check mark detection period.
1600 Tandem check mark detection period

[FIG. 17]

1701 First tandem check mark pattern
1702 Second tandem check mark pattern
1703 Third tandem check mark pattern
1704 Fourth tandem check mark pattern

[FIG. 18]

Decode the series of element marks within the tandem check mark detection period.
1800 Tandem check mark detection period

What is claimed is:

1. A tandem continuous paper printer comprising:

a first printer engine that, apart from performing printing of print data that comprises a print job, performs printing of a tandem check mark on paper at a page interval called “a check page interval S”, said check page interval S comprising a random interval;

a second printer engine comprising a sensor that detects whether said tandem check mark at the check page interval S exists when a printing of respective pages by the second printer engine is performed, the check page interval S being generated in units of pages; and a printer controller which provides image data to said first and second printer engines, said random interval being generated by said printer controller, wherein tandem printing is performed by using the second printer engine on paper that has been printed on by the first printer engine, wherein the second printer engine continues with the printing of the print data if the tandem check mark is recognized by the sensor, wherein the printing of the print data is stopped if the tandem check mark is not recognized by sensor, and wherein the tandem check mark is given for a plurality of pages defined by the check page interval S.

2. The tandem continuous paper printer according to claim 1, wherein if the tandem check mark is not recognized, the printer controller executes error recovery printing after the printing is stopped.

3. The tandem continuous paper printer according to claim 1, wherein the tandem continuous paper printer performs a tandem duplex print mode, in which, after the first printer engine performs printing on a front surface of a paper, the paper is inverted and then supplied to the second printer engine, and the second printer engine performs printing on a back surface of the inverted paper, and wherein said sensor detects said tandem check mark on the back surface of the inverted paper.

4. The tandem continuous paper printer according to claim 1, wherein the tandem continuous paper printer performs a tandem single-side print mode, in which, after the first printer engine performs printing on a front surface of a paper, the paper is supplied non-inverted to the second printer engine and the second printer engine performs printing on the front surface of the paper, and wherein said sensor detects said tandem check mark on the front surface of the non-inverted paper.

5. The tandem continuous paper printer according to claim 1, wherein the first printer engine and the second printer engine comprise electrophotographic printer engines comprising at least an imaging drum and a fixing unit, and wherein the check page interval S comprises a length corresponding to a recovery length for a paper interval, for which fixing by the fixing unit is not guaranteed when an emergency stop error occurs at one of the printer engines.

6. The tandem continuous paper printer according to claim 1, wherein the paper is managed by a page serial number of a single page unit, wherein the page serial number is counted beyond an individual print job and across a plurality of print jobs, and wherein management of a check page interval is performed using the page serial number.

7. The tandem continuous paper printer according to claim 1, wherein, when the tandem check mark is undetected consecutively for two check page intervals S, the printing is stopped.

8. The tandem continuous paper printer according to claim 1, wherein patterns in a plurality of pattern series are repeated in order and used as a tandem check pattern.

9. The tandem continuous paper printer according to claim 8, wherein if the tandem check mark is not recognized, the printer controller executes error recovery printing after the printing is stopped.

10. The tandem continuous paper printer according to claim 8, wherein the tandem continuous paper printer has a tandem duplex print mode, in which, after the first printer engine performs printing on a front surface of a paper, the paper is inverted and then supplied to the second printer engine, and the second printer engine performs printing on a back surface of the inverted paper, and wherein said sensor detects said tandem check mark on the back surface of the inverted paper.

11. The tandem continuous paper printer according to claim 8, wherein the tandem continuous paper printer performs a tandem single-side print mode, in which, after the first printer engine performs printing on a front surface of a paper, the paper is supplied non-inverted to the second printer engine and the second printer engine performs printing on the front surface of the paper, and wherein said sensor detects said tandem check mark on the front surface of the non-inverted paper.

12. The tandem continuous paper printer according to claim 8, wherein the first printer engine and the second printer engine comprise electrophotographic printer engines comprising at least an imaging drum and a fixing unit.

13. The tandem continuous paper printer according to claim 8, wherein the paper is managed by a page serial number of a single page unit, wherein the page serial number is counted beyond an individual print job and across a plurality of print jobs, and wherein management of a check page interval is performed using the page serial number.

14. The tandem continuous paper printer according to claim 8, wherein, when the tandem check mark is undetected consecutively for two check page intervals S, the printing is stopped.

15. The tandem continuous paper printer according to claim 8, wherein the plurality of pattern series comprises a plurality of element marks.

16. The tandem continuous paper printer according to claim 8, wherein the plurality of pattern series comprises a plurality of element marks, wherein, in the printing of said respective pages by the second printer engine, a number of the element marks is counted each time the tandem check pattern is recognized, and wherein whether the tandem check mark is recognized correctly is judged based on the number of the element marks.

17. The tandem continuous paper printer according to claim 8, wherein the plurality of pattern series comprises a plurality of element marks, wherein the element marks express binary values such that said patterns express numerical values, wherein, in the printing of said respective pages by the second printer engine, the element marks are recognized numerically as a binary number of plural digits, and wherein whether the tandem check pattern is recognized correctly is judged based on the numerical values.

18. A tandem continuous paper printer comprising:

a first printer engine;

a second printer engine; and a printer controller which provides image data to said first and second printer engines, a random interval being generated by said printer controller, wherein tandem printing is performed by using the second printer engine on a paper that has been printed on by the first printer engine, wherein the first printer engine, apart from performing printing of print data that make up a print job, performs printing of a tandem check mark on the paper at each check page interval S, wherein the second printer engine includes a sensor detecting the tandem check mark, wherein, in performing the printing of each page, the second printer engine checks, by the sensor, whether or not the tandem check mark printed by the first printer engine exists at each check page interval S, the check page interval S being generated in units of pages, wherein if the tandem check mark is detected, the second printer engine continues with the printing of the print data while if the tandem check mark is not detected, the printing is stopped, wherein the check page interval S comprises said random interval, and wherein the tandem check mark is given for a plurality of pages defined by the check page interval S.

19. The tandem continuous paper printer according to claim 18, wherein if the tandem check mark is not detected, the printer controller executes error recovery printing after the printing is stopped.

20. The tandem continuous paper printer according to claim 18, wherein the tandem continuous paper printer performs a tandem duplex print mode, in which, after the first printer engine performs printing on a front surface of a paper, the paper is inverted and then supplied to the second printer engine, and the second printer engine performs printing on a back surface of the inverted paper, and wherein a sensor, installed at the second printer engine to detect marks on the back surface of the inverted paper, is used to recognize the tandem check marks.

21. The tandem continuous paper printer according to claim 18, wherein the tandem continuous paper printer performs a tandem single-side print mode, in which, after the first printer engine performs printing on a front surface of a paper, the paper is supplied as it is without being inverted to the second printer engine and the second printer engine performs printing on the front surface of the paper, and wherein a sensor, installed at the second printer engine to detect marks on the front surface of the non-inverted paper, is used to recognize the tandem check marks.

22. The tandem continuous paper printer according to claim 18, wherein the first printer engine and the second printer engine are electrophotographic printer engines equipped at least with an imaging drum and a fixing unit.

23. The tandem continuous paper printer according to claim 18, wherein the paper is managed by a page serial number of a single page unit, wherein the page serial number is counted beyond each individual print job and across a plurality of print jobs, and wherein management of a check page interval is performed using the page serial number.

24. The tandem continuous paper printer according to claim 18, wherein when the tandem check marks are undetected consecutively for two check page intervals S, the printing is stopped.

25. The tandem continuous paper printer according to claim 1, wherein the sensor comprises a first sensor, wherein the second printer engine further comprises a second sensor for detecting the tandem check mark, one of said first sensor and said second sensor detecting whether the tandem check mark at the check page interval S exists when said printing of the respective pages by the second printer engine is performed, wherein the second printer engine continues with the printing of the print data, if the tandem check mark is recognized by said one of the first sensor and the second sensor, wherein the printing of the print data is stopped if the tandem check mark is not recognized by said one of the first sensor and the second sensor, and wherein the first sensor and the second sensor are disposed on opposing sides of the paper.

26. The tandem continuous paper printer according to claim 25, wherein the tandem continuous paper printer performs a tandem duplex print mode, in which, after the first printer engine performs printing on a front surface of a paper, the paper is inverted and then supplied to the second printer engine, and the second printer engine performs printing on a back surface of the inverted paper, wherein the tandem continuous paper printer performs a tandem single-side print mode, in which, after the first printer engine performs printing on a front surface of a paper, the paper is supplied as it is without being inverted to the second printer engine and the second printer engine performs printing on the front surface of the paper, wherein said one of the first sensor and the second sensor, installed at the second printer engine to detect marks on the front surface or the back surface of the inverted paper, is used to recognize the tandem check marks in tandem duplex print mode, and wherein another one of the first sensor and the second sensor, installed at the second printer engine to detect marks on the front surface or the back surface of the non-inverted paper, is used to recognize the tandem check marks in tandem single-side print mode.

27. The tandem continuous paper printer according to claim 18, wherein the sensor comprises a first sensor and the second printer engine further includes a second sensor for detecting the tandem check mark, wherein whether the tandem check mark printed by the first printer engine is recognized at the check page interval S is checked by using the first sensor or the second sensor, when printing of the respective pages by the second printer engine is performed, wherein the second printer engine continues with the printing of the print data, if the tandem check mark is recognized by the first sensor or the second sensor, wherein the printing of the print data is stopped, if the tandem check mark is not recognized by the first sensor or the second sensor, and wherein the first sensor and the second sensor are disposed on opposing sides of the paper.

28. The tandem continuous paper printer according to claim 27, wherein the tandem continuous paper printer performs a tandem duplex print mode, in which, after the first printer engine performs printing on a front surface of a paper, the paper is inverted and then supplied to the second printer engine, and the second printer engine performs printing on a back surface of the inverted paper, wherein the tandem continuous paper printer performs a tandem single-side print mode, in which, after the first printer engine performs printing on a front surface of a paper, the paper is supplied as it is without being inverted to the second printer engine and the second printer engine performs printing on the front surface of the paper, wherein one of the first sensor and the second sensor, installed at the second printer engine to detect marks on the front surface or the back surface of the inverted paper, is used to recognize the tandem check marks in tandem duplex print mode, and wherein another of the first sensor and the second sensor, installed at the second printer engine to detect marks on the front surface or the back surface of the non-inverted paper, is used to recognize the tandem check marks in tandem single-side print mode.

29. The tandem continuous paper printer according to claim 1, wherein the check page interval S ranges from 7 to 17.

30. The tandem continuous paper printer according to claim 1, wherein said random interval is in a range from −5 to +5.

31. The tandem continuous paper printer according to claim 8, wherein a tandem relationship mismatch error occurs when said patterns in said plurality of pattern series are not repeated in accordance with an expected predetermined order.

32. The tandem continuous paper printer according to claim 1, wherein said check page interval S is randomly changed when the printing of the print data and the tandem check mark is performed by the first printer engine.

* * * * *